United States Patent
Byun et al.

(10) Patent No.: US 11,265,858 B2
(45) Date of Patent: Mar. 1, 2022

(54) METHOD AND DEVICE FOR PERFORMING DEVICE-TO-DEVICE COMMUNICATION BY SHARING UPLINK RESOURCE AND SIDELINK RESOURCE IN WIRELESS COMMUNICATION SYSTEM

(71) Applicant: LG ELECTRONICS INC., Seoul (KR)

(72) Inventors: Ilmu Byun, Seoul (KR); Jiwon Kang, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 142 days.

(21) Appl. No.: 16/628,249

(22) PCT Filed: Jul. 7, 2017

(86) PCT No.: PCT/KR2017/007324
§ 371 (c)(1),
(2) Date: Jan. 2, 2020

(87) PCT Pub. No.: WO2019/009454
PCT Pub. Date: Jan. 10, 2019

(65) Prior Publication Data
US 2020/0178221 A1 Jun. 4, 2020

(51) Int. Cl.
*H04W 4/46* (2018.01)
*H04W 4/70* (2018.01)
(Continued)

(52) U.S. Cl.
CPC ......... *H04W 72/042* (2013.01); *H04L 5/0048* (2013.01); *H04W 72/046* (2013.01)

(58) Field of Classification Search
None
See application file for complete search history.

(56) References Cited

U.S. PATENT DOCUMENTS

2013/0090141 A1  4/2013  Hottinen
2015/0171944 A1  6/2015  Kalhan
(Continued)

FOREIGN PATENT DOCUMENTS

EP        3609260         2/2020
KR     1020120024340      3/2012
(Continued)

OTHER PUBLICATIONS

Japan Patent Office Application No. 2020-500090, Office Action dated Apr. 21, 2021, 3 pages.
Nokia, "On Simultaneous Uu and PC5 operation in different carrier," 3GPP TSG-RAN Meeting #88, R1-1703204, Feb. 2017, 2 pages.
(Continued)

*Primary Examiner* — Duc T Duong
(74) *Attorney, Agent, or Firm* — Lee, Hong, Degerman, Kang & Waimey PC

(57) ABSTRACT

Provided are a method and equipment for performing device-to-device communication by sharing an uplink resource and a sidelink resource in a wireless communication system. Particularly, a first terminal transmits a reference signal to a base station. The first terminal receives a downlink control signal from the base station. The downlink control signal includes beam limiting information indicating a beam, which is not used for reducing interference with an uplink signal, when the first terminal transmits a sidelink signal. The first terminal transmits the sidelink signal to a second terminal by using beams excluding the beam indicated by the beam limiting information. The sidelink signal is transmitted through a resource pool in which the uplink resource and the sidelink resource are overlapped in time and frequency domains.

20 Claims, 20 Drawing Sheets

(51) Int. Cl.
*H04W 72/04* (2009.01)
*H04L 5/00* (2006.01)

(56) References Cited

U.S. PATENT DOCUMENTS

| | | | | |
|---|---|---|---|---|
| 2015/0381396 | A1* | 12/2015 | Chen | H04J 13/16 370/254 |
| 2016/0183219 | A1 | 6/2016 | Kim et al. | |
| 2017/0195998 | A1* | 7/2017 | Zhang | H04L 5/0057 |
| 2018/0249453 | A1* | 8/2018 | Nagaraja | H04W 72/042 |
| 2018/0343605 | A1* | 11/2018 | Wu | H04B 7/088 |
| 2019/0312705 | A1* | 10/2019 | Takano | H04L 25/0226 |
| 2020/0028544 | A1* | 1/2020 | Bengtsson | H04B 7/0408 |
| 2020/0145079 | A1* | 5/2020 | Marinier | H04B 7/0456 |
| 2020/0186207 | A1* | 6/2020 | Davydov | H04B 7/0417 |
| 2020/0204971 | A1* | 6/2020 | Yasukawa | H04W 4/70 |

FOREIGN PATENT DOCUMENTS

| | | |
|---|---|---|
| WO | 2014126022 | 8/2014 |
| WO | 2016022844 | 2/2016 |
| WO | 2016108553 | 7/2016 |

OTHER PUBLICATIONS

Huawei, HiSilicon, "Discussion on UE capability reporting for V2X," 3GPP TSG-RAN WG2 #97bis, R2-1702501, Apr. 2017, 2 pages.
Ericsson, "Additional Considerations for V2V Scenarios," 3GPP TSG-RAN WG4 #79, R4-163505, May 2016, 6 pages.
European Patent Office Application Serial No. 17916795.2, Search Report dated Apr. 28, 2020, 12 pages.
Chee Kyun Ng, et al,"Space Division Duplex (SDD) System using Smart Antenna", IEEE International Workshop on Antenna Technology, Mar. 2005, 12 pages.
PCT International Application No. PCT/KR2017/007324, International Search Report dated Mar. 20, 2018, 4 pages.
Lenovo, et al., "Sidelink resource allocation and configuration", 3GPP TSG RAN WG1 Meeting #89, R1-1707772, May 2017, 5 pages.
Intel, "Sidelink Resource Allocation and Configuration for Wearable and IoT Use Cases", 3GPP TSG RAN WG1 Meeting #89, R1-1707333, May 2017, 10 pages.
Korean Intellectual Property Office Application No. 10-2019-7033960, Office Action dated Oct. 21, 2021, 4 pages.

* cited by examiner

■ : RU

■ : RU

METHOD AND DEVICE FOR PERFORMING DEVICE-TO-DEVICE COMMUNICATION BY SHARING UPLINK RESOURCE AND SIDELINK RESOURCE IN WIRELESS COMMUNICATION SYSTEM

CROSS-REFERENCE TO RELATED APPLICATIONS

This application is the National Stage filing under 35 U.S.C. 371 of International Application No. PCT/KR2017/007324, filed on Jul. 7, 2017, the content of which is hereby incorporated by reference herein in its entirety.

BACKGROUND

Field

The present specification relates to wireless communication and, more particularly, to a method for performing device-to-device communication by sharing an uplink resource and a sidelink resource in a wireless communication system and a device using the same.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink resource allocation, physical layer structure, and synchronization. In the meantime, V2V operation scenarios based on not only LTE PC5 interface but also LTE Uu interface or a combination of Uu and PC5 has been considered. The maximum efficiency of V2V services may be achieved by selecting/switching the operation scenario properly.

Early completion of the corresponding radio access network (RAN) specification for PC5-based V2V and integration with Uu interface will enable fast preparation for device and network implementation, thereby allowing more chance for LTE-based V2V in the market. In addition, it can provide the basis for other V2X services, especially vehicle-to-infrastructure/network (V2I/N) and vehicle-to-pedestrian (V2P) services, so that RAN support for all the V2X services can be completed in time.

SUMMARY

The present specification provides a method and a device for performing device-to-device communication by sharing an uplink resource and a sidelink resource in a wireless communication system.

The present specification proposes a method and a device for performing device-to-device communication by sharing an uplink resource and a sidelink resource.

The device includes a radio frequency (RF) unit to transmit and receive a radio signal and a processor connected to the RF unit.

According to the present embodiment, a signal may be transmitted and received between a first UE and a second UE through a sidelink, and a signal may be transmitted and received between the first UE and a base station through an uplink. An uplink resource and a sidelink resource share a time/frequency resource, which may be spatially divided using a beam to which a distributed antenna is applied to thereby perform communication. In this case, the UE may have a plurality of radio units (RUs), an RU may correspond to an antenna port, and a beam or a beam group may be set with the antenna port.

The first UE transmits a reference signal to the base station. The reference signal is transmitted to determine beam information used for transmitting a sidelink signal. The reference signal may correspond to an SRS.

Before the first UE transmits the reference signal, the first UE may receive UE-specific allocation information about the reference signal from the base station. The allocation information about the reference signal may include information about transmission time, a transmission frequency, a sequence resource, transmission power for the reference signal and information about an antenna port through which the reference signal is transmitted.

The first UE receives a downlink control signal from the base station. The downlink control signal includes beam restriction information indicating a beam that is not used to reduce interference in an uplink signal when the first UE transmits a sidelink signal.

The beam restriction information may be explicitly included in the downlink control signal as a beam index. Alternatively, the beam restriction information may be implicitly included in the downlink control signal. For example, the time, frequency, or sequence resource index used for the UE to transmit the reference signal may be implicitly indicated via the downlink control signal. Here, when the UE uses beam A in time resource 1 and the base station indicates time resource 1 information as the beam restriction information via the downlink control signal, the UE may determine that beam A is restricted. This operation may also be applied when beam recommendation information is transmitted via the downlink control signal.

The downlink control signal may further include beam recommendation information indicating a beam used when the first UE transmits an uplink signal. In addition, the downlink control signal may further include a channel information type field. When the channel information type field indicates a first value, the beam recommendation information may be included in the downlink control signal. When the channel information type field indicates a second value, the beam restriction information may be included in the downlink control signal.

Although it has been mentioned that the beam restriction information corresponds to sidelink beam-related information and the beam recommendation information corresponds to uplink beam-related information, this is merely an example. Instead, various modifications may be applicable such that the beam restriction information may be uplink beam-related information and the beam recommendation information may be sidelink beam-related information.

The first UE transmits the sidelink signal to the second UE using a beam other than the beam indicated by the beam restriction information. The sidelink signal is transmitted through a resource pool in which an uplink resource and a sidelink resource overlap in time and frequency domains. The uplink signal may be transmitted to the base station through the resource pool using the beam indicated by the beam recommendation information. Accordingly, incurred interference between the uplink and the sidelink may be prevented using an overlapping resource.

Here, the first UE may receive allocation information about the resource pool from the base station cell-commonly or UE-specifically. In the present embodiment, the base station merely transmits only the allocation information about the resource pool in which the uplink resource and the sidelink resource overlap without controlling device-to-device unicast communication.

The beam restriction information may also include the index and transmission power of the beam not used when the first UE transmits the sidelink signal. The beam recommendation information may include the index and transmission power of the beam used when the first UE transmits the uplink signal.

Here, the sidelink signal may be transmitted using transmission power lower than that of the beam not used when the first UE transmits the sidelink signal. The uplink signal may be transmitted using the transmission power of the beam used when the first UE transmits the uplink signal.

The first UE may receive a first temporary identifier and a second temporary identifier from the base station, which is for allocating an additional temporary identifier to specify the type of channel information in the downlink control signal.

When the cyclic redundancy check (CRC) of the downlink control signal is masked with the first temporary identifier, the beam recommendation information may be included in the downlink control signal. When the CRC of the downlink control signal is masked with the second temporary identifier, the beam restriction information may be included in the downlink control signal.

The downlink control signal may further include a scheduling field for the uplink signal. Here, even when the base station does not perform uplink scheduling for the first UE, the scheduling field for the uplink signal may be included. When the first UE does not transmit the uplink signal, the scheduling field for the uplink signal may be set to NULL. When the scheduling field is set to NULL, the first UE may determine that beam-related information for transmitting the sidelink signal is transmitted through the downlink control signal.

The sidelink signal may be transmitted in a unicast or multicast manner A device-to-device broadcast or discovery signal needs a dedicated resource. However, since a device-to-device unicast signal is aperiodically transmitted when traffic is generated in the UE, the sidelink resource overlaps with the uplink resource, thereby reducing resource consumption.

Using the proposed method enables a UE to simultaneously establish a plurality of device-to-device connections. Further, the UE can apply different RUs to the respective connections. When interference between RUs used for different connections is insignificant, the UE may operate one RU to receive a signal while operating another RU to transmit a signal.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC- FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the 3GPP LTE/LTE-A. However, technical features of the present specification are not limited thereto.

Figure 1:
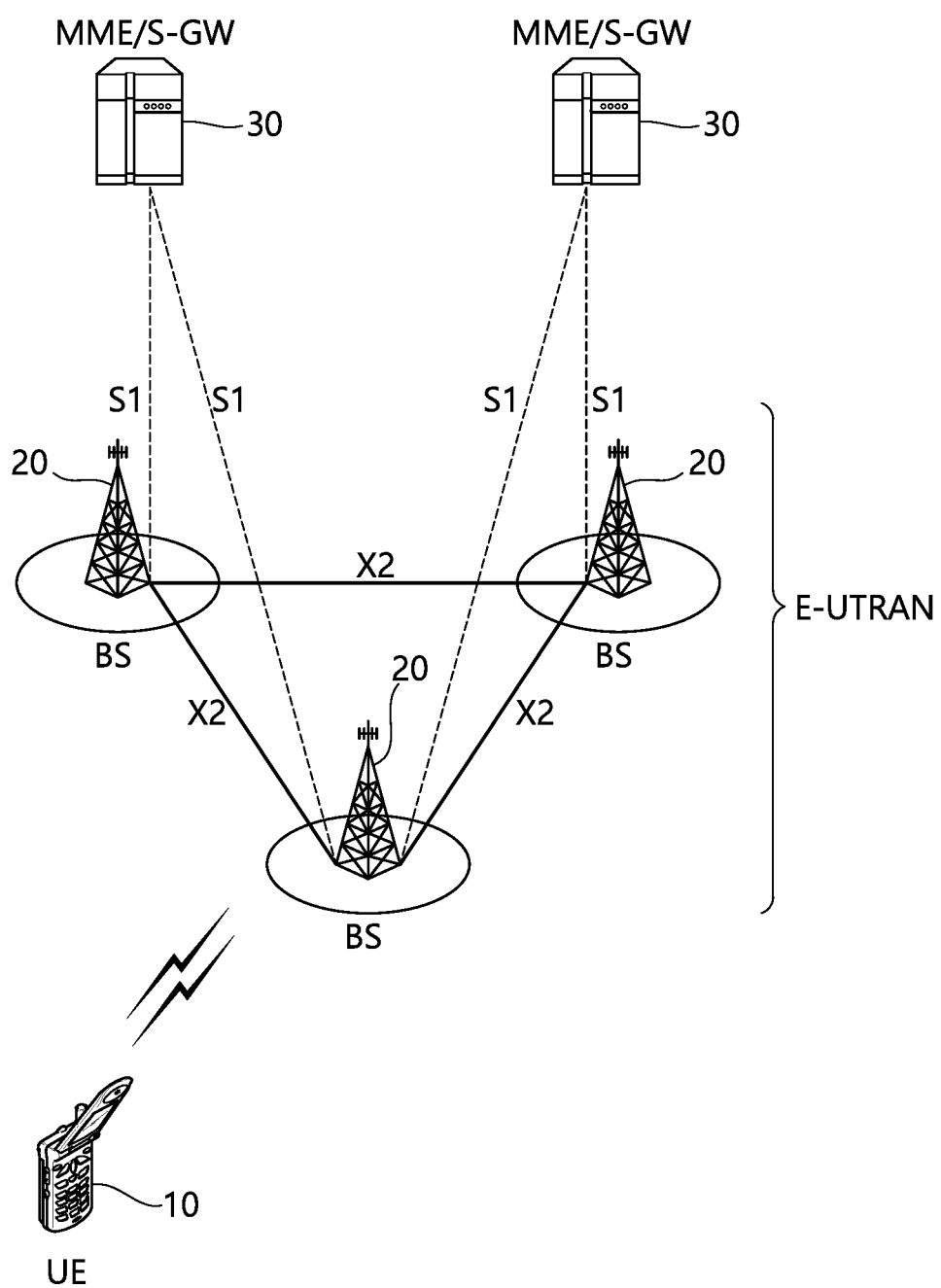
FIG. 1 illustrates a wireless communication system to which the present specification is applied.

FIG. 1 illustrates a wireless communication system to which the present specification is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
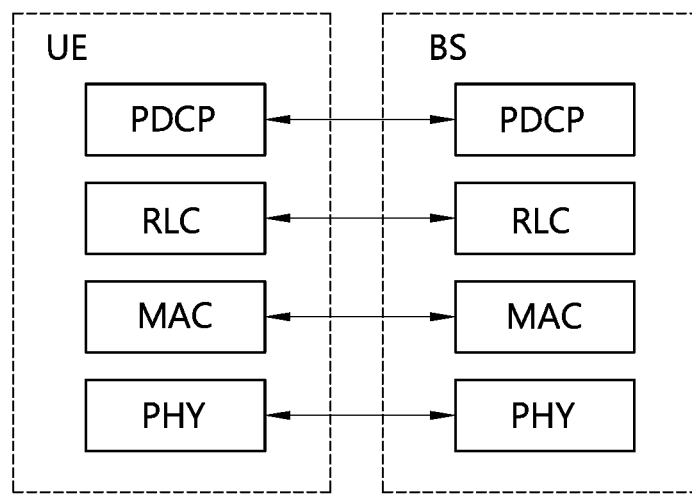
FIG. 2 is a block diagram illustrating a radio protocol architecture for a user plane.
Figure 3:
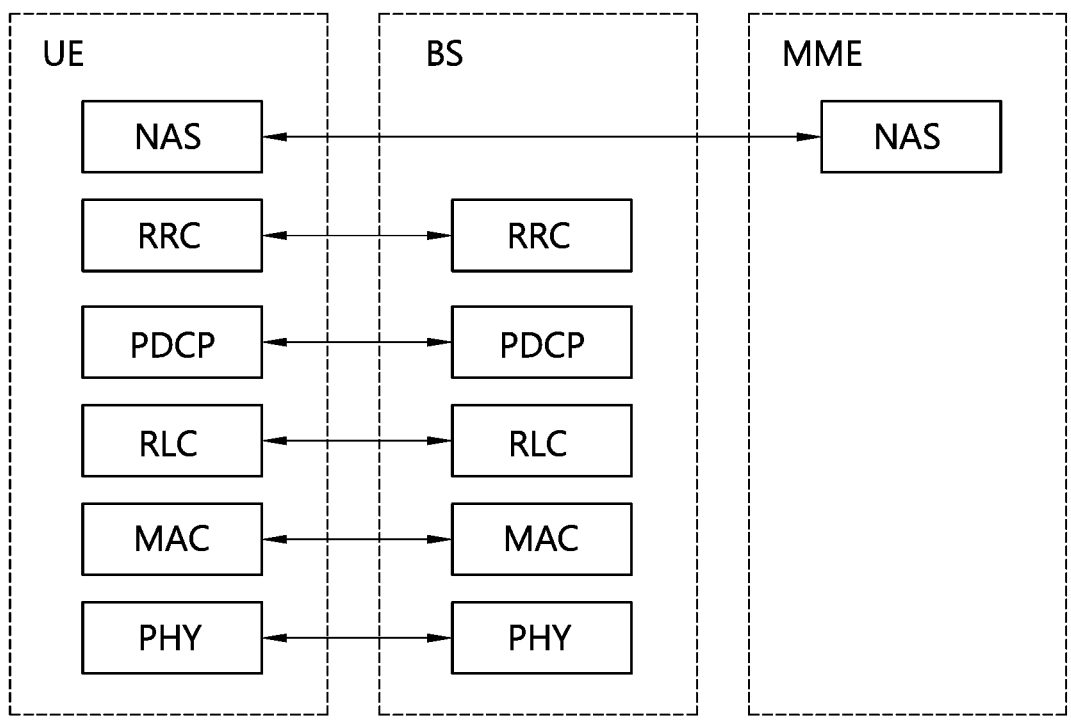
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Hereinafter, a sidelink is described. The sidelink is an interface between UEs for sidelink communication and sidelink direct discovery. The sidelink corresponds to a PC5 interface. The side link communication is AS functionality enabling proximity-based services (ProSe) direct communication between two or more nearby UEs by using an E-UTRAN technique but not traversing any network node. The sidelink discovery is AS functionality enabling ProSe direct discovery between two or more nearby UEs by using the E-UTRA technique but not traversing any network node. The sidelink uses a UL resource and physical channel structure similarly to UL transmission. Sidelink transmission uses the same basic transmission scheme as the UL transmission scheme. However, the sidelink is limited to single cluster transmission for all sidelink physical channels. In addition, the sidelink uses a gap of one symbol at an end of each sidelink subframe.

Figure 4:
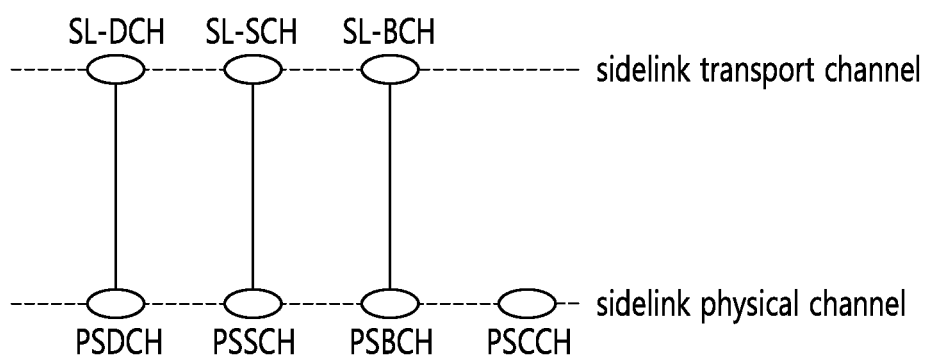
FIG. 4 shows mapping between sidelink transport channels and sidelink physical channels.

FIG. 4 shows mapping between sidelink transport channels and sidelink physical channels. Referring to FIG. 4, a physical sidelink discovery channel (PSDCH) carrying sidelink discovery message from the UE is mapped to a sidelink discovery channel (SL-DCH). A physical sidelink shared channel (PSSCH) carrying data from a UE for sidelink communication is mapped to a sidelink shared channel (SL-SCH). A physical sidelink broadcast channel (PSBCH) carrying system and synchronization related information, transmitted from the UE, is mapped to a sidelink broadcast channel (SL-BCH). a physical sidelink control channel (PSCCH) carries control from a UE for sidelink communication.

Figure 5:
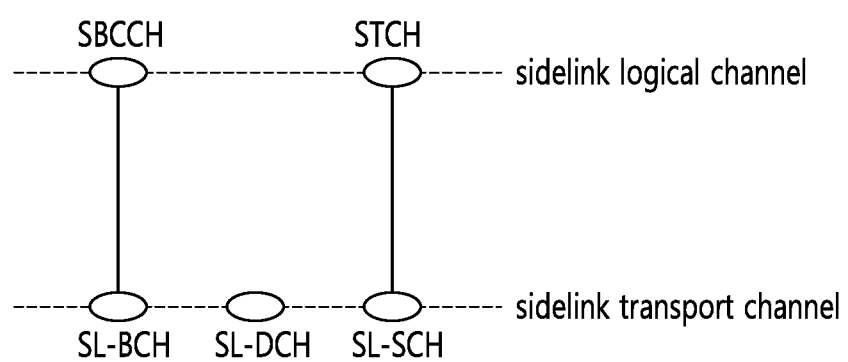
FIG. 5 shows mapping between sidelink logical channels and sidelink transport channels.

FIG. 5 shows mapping between sidelink logical channels and Sidelink transport channels. Referring to FIG. 5, SL-BCH is mapped to a sidelink broadcast control channel (SBCCH). The SBCCH is a sidelink channel for broadcasting sidelink system information from one UE to other UE(s). This channel is used only by sidelink communication capable UEs. SL-SCH is mapped to a sidelink traffic channel (STCH). The STCH is a point-to-multipoint channel, for transfer of user information from one UE to other UEs. This channel is used only by sidelink communication capable UEs.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

In order to perform synchronization for out of coverage operation, UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH. Otherwise, UE uses pre-configured parameters. System information block type-18 (SIB18) provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of sidelink control period. The sidelink control period is the period over which resources allocated in a cell for sidelink control information and sidelink data transmissions occur. Within the sidelink control period, the UE sends sidelink control information followed by sidelink data. Sidelink control information indicates a Layer 1 ID and characteristics of the transmissions (e.g. MCS, location of the resource(s) over the duration of sidelink control period, timing alignment).

The UE performs transmission and reception over Uu and PC5 with the following decreasing priority order:
Uu transmission/reception (highest priority);
PC5 sidelink communication transmission/reception;
PC5 sidelink discovery announcement/monitoring (lowest priority).

The UE supporting sidelink communication can operate in two modes for resource allocation. The first mode is a scheduled resource allocation. The scheduled resource allocation may be referred to as Mode 1. In Mode 1, the UE needs to be RRC_CONNECTED in order to transmit data. The UE requests transmission resources from the eNB. The eNB schedules transmission resources for transmission of sidelink control information and data. The UE sends a scheduling request (dedicated scheduling request (D-SR) or random access) to the eNB followed by a sidelink buffer status report (BSR). Based on the sidelink BSR, the eNB can determine that the UE has data for a sidelink communication transmission and estimate the resources needed for transmission. The eNB can schedule transmission resources for sidelink communication using configured sidelink radio network temporary identity (SL-RNTI).

The second mode is a UE autonomous resource selection. The UE autonomous resource selection may be referred to as Mode 2. In Mode 2, a UE on its own selects resources from resource pools and performs transport format selection to transmit sidelink control information and data. There can be up to 8 transmission pools either pre-configured for out of coverage operation or provided by RRC signalling for in-coverage operation. Each pool can have one or more ProSe per-packet-priority (PPPP) associated with it. For transmission of a MAC protocol data unit (PDU), UE selects a transmission pool in which one of the associated PPPP is equal to the PPPP of a logical channel with highest PPPP among the logical channel identified in the MAC PDU. There is one to one association between sidelink control pool and sidelink data pool. Once the resource pool is selected, the selection is valid for the entire sidelink control period. after the sidelink control period is finished, the UE may perform resource pool selection again.

A set of transmission and reception resource pools for sidelink control information when the UE is out of coverage for sidelink communication is pre-configured in the UE. The resource pools for sidelink control information when the UE is in coverage for sidelink communication are configured as below. The resource pools used for reception are configured by the eNB via RRC, in broadcast signaling. The resource pool used for transmission is configured by the eNB via RRC, in dedicated or broadcast signaling, if Mode 2 is used, and the resource pool used for transmission is configured by the eNB via RRC, in dedicated signaling if Mode 1 is used. The eNB schedules the specific resource(s) for sidelink control information transmission within the configured reception pools.

A set of transmission and reception resource pools for data when the UE is out of coverage for sidelink communication is pre-configured in the UE. The resource pools for data when the UE is in coverage for sidelink communication are configured as below. The resource pools used for transmission and reception are configured by the eNB via RRC, in dedicated or broadcast signaling, if Mode 2 is used. There is no resource pool for transmission and reception if Mode 1 is used.

Sidelink discovery is defined as the procedure used by the UE supporting sidelink discovery to discover other UE(s) in its proximity, using E-UTRA direct radio signals via PC5. Sidelink discovery is supported both when UE is served by EUTRAN and when UE is out of EUTRA coverage. Only ProSe-enabled public safety UE can perform sidelink discovery when it is out of EUTRA coverage. For public safety sidelink discovery, the allowed frequency is pre-configured in the UE, and is used even when UE is out of coverage of EUTRA in that frequency. The pre-configured frequency is the same frequency as the public safety ProSe carrier.

In order to perform synchronization, UE(s) participating in announcing of discovery messages may act as a synchronization source by transmitting a synchronization signal based on the resource information for synchronization signals provided in SIB19.

There are two types of resource allocation for discovery message announcement. The first type is UE autonomous resource selection which is a resource allocation procedure where resources for announcing of discovery message are allocated on a non UE specific basis. The UE autonomous resource selection may be referred to as Type 1. In Type 1, the eNB provides the UE(s) with the resource pool configuration used for announcing of discovery message. The configuration may be signaled in broadcast or dedicated signaling. The UE autonomously selects radio resource(s) from the indicated resource pool and announces discovery message. The UE can announce discovery message on a randomly selected discovery resource during each discovery period.

The second type is scheduled resource allocation which is a resource allocation procedure where resources for announcing of discovery message are allocated on per UE specific basis. The scheduled resource allocation may be referred to as Type 2. In Type 2, the UE in RRC_CONNECTED may request resource(s) for announcing of discovery message from the eNB via RRC. The eNB assigns resource(s) via RRC. The resources are allocated within the resource pool that is configured in UEs for announcement.

For UEs in RRC_IDLE, the eNB may select one of the following options. The eNB may provide a resource pool for UE autonomous resource selection based discovery message announcement in SIB19. UEs that are authorized for sidelink discovery use these resources for announcing discovery message in RRC_IDLE. Or, the eNB may indicate in SIB19 that it supports sidelink discovery but does not provide resources for discovery message announcement. UEs need to enter RRC_CONNECTED in order to request resources for discovery message announcement.

For UEs in RRC_CONNECTED, a UE authorized to perform sidelink discovery announcement indicates to the eNB that it wants to perform sidelink discovery announcement. UE can also indicate to the eNB, the frequency(s) in which sidelink discovery announcement is desired. The eNB validates whether the UE is authorized for sidelink discovery announcement using the UE context received from MME. The eNB may configure the UE with resource pool for UE autonomous resource selection for discovery message announcement via dedicated signaling. The eNB may configure resource pool along with dedicated resource in the form of time and frequency indices for discovery message announcement via dedicated RRC signaling. The resources allocated by the eNB via dedicated signaling are valid until the eNB re-configures the resource(s) by RRC signaling or the UE enters RRC_IDLE.

Authorized receiving UEs in RRC_IDLE and RRC_CONNECTED monitor resource pools used for UE autonomous resource selection and resource pools for scheduled resource allocation. The eNB provides the resource pool configuration used for discovery message monitoring on intra frequency, inter frequency of same or different PLMNs cells in RRC signaling (SIB19 or dedicated). The RRC signaling (SIB19 or dedicated) may contain detailed sidelink discovery configuration used for announcement of sidelink discovering in cells of intra-frequency, inter-frequency of same or different PLMNs.

Vehicle-to-everything (V2X) communication is described. V2X communication contains the three different types, i.e. vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, road side unit (RSU), and pedestrians, can collect knowledge of their local environment (e.g. Information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X service, where one party is a UE and the other party is an RSU both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

In V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

In V2I, the UE supporting V2I applications sends application layer information to RSU. RSU sends application layer information to a group of UEs or a UE supporting V2I applications.

In V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X service. The UE supporting V2P applications transmits application layer information. Such information can be broadcast by a vehicle with UE supporting V2X Service (e.g. Warning to pedestrian), and/or by a pedestrian with UE supporting V2X Service (e.g. Warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

Hereinafter, space division duplex (SDD) for V2X communication is described.

The SDD considered in the present specification is a technique in which each antenna of a UE is subjected to space division to independently operate a communication link of each antenna. In order to independently operate the communication link for each antenna, self-interference between antennas of the UE shall be cancelled, and interference between UEs included in the communication link shall be reduced.

As a technique for cancelling the self-interference between the antennas of the UE, there is a technique of applying analog and digital self-interference cancellation techniques or a technique of reducing the self-interference by securing a distance between the antennas. The latter has a lower complexity than the former and thus is easier to apply to real systems. The latter technique can be applied to a vehicle UE having a larger size than an existing communication UE by securing the distance between the antennas. The inter-cell interference reducing technique of the existing cellular communication system can be applied as a technique for reducing interference between UEs. At present, in cellular communication with a high frequency of at least 6 GHz, since a beam width is small in order to secure a communication distance, it is considered that there is a low probability that beams of adjacent cells overlap to cause interference. In addition, there is a high probability that a signal will is blocked by an object due to linearity of the signal. Since a surface of a vehicle is made of iron and a size thereof is large, there is a high probability that a high-frequency signal of an adjacent UE will be blocked.

Figure 6:
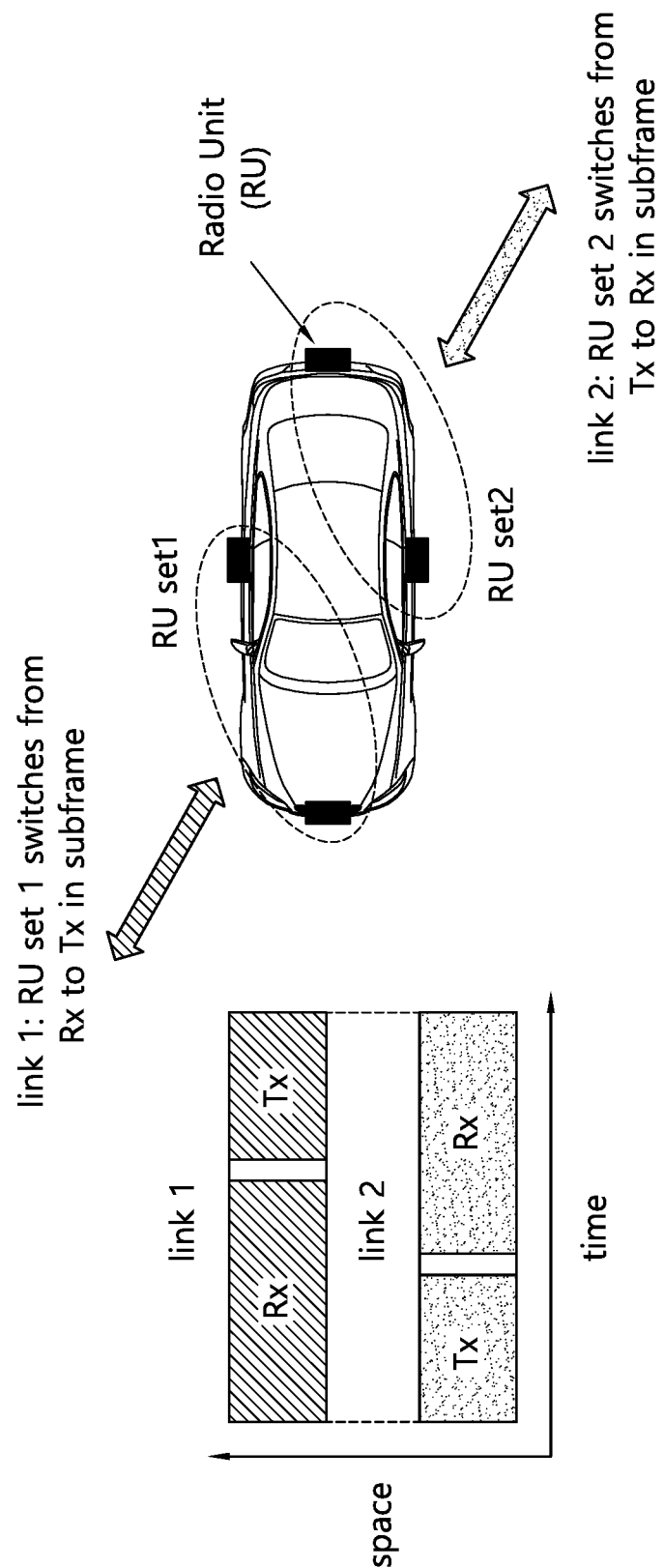
FIG. 6 shows an example of applying space division duplex (SDD) in a vehicle to which distributed antennas are applied.

Due to the above characteristics, space division communication is easy to apply in inter-vehicle high frequency communication with distributed antennas. When the space division communication is applied, since links of the antennas are isolated from each other, it is possible to allocate different transmission/reception points of the respective communication links and reuse frequency resources in each communication link. FIG. 6 is an example of applying space division communication.

FIG. 6 shows an example of applying SDD in a vehicle to which distributed antennas are applied.

In FIG. 6, a link 1 and a link 2 are communication links connected with different devices (UE or BS). According to a situation of each communication link, a transmission (Tx) resource and a reception (Rx) resource may change in amount, and a Tx time point and an Rx time point may change. In the figure above, a radio unit (RU) is an antenna module which aggregates a plurality of antennas. In this case, the UE has 4 RUs in a distributed manner 2 RUs out of the 4 RUs are used to construct the link 1, and the remaining 2 RUs are used to construct the link 2.

Figure 7:
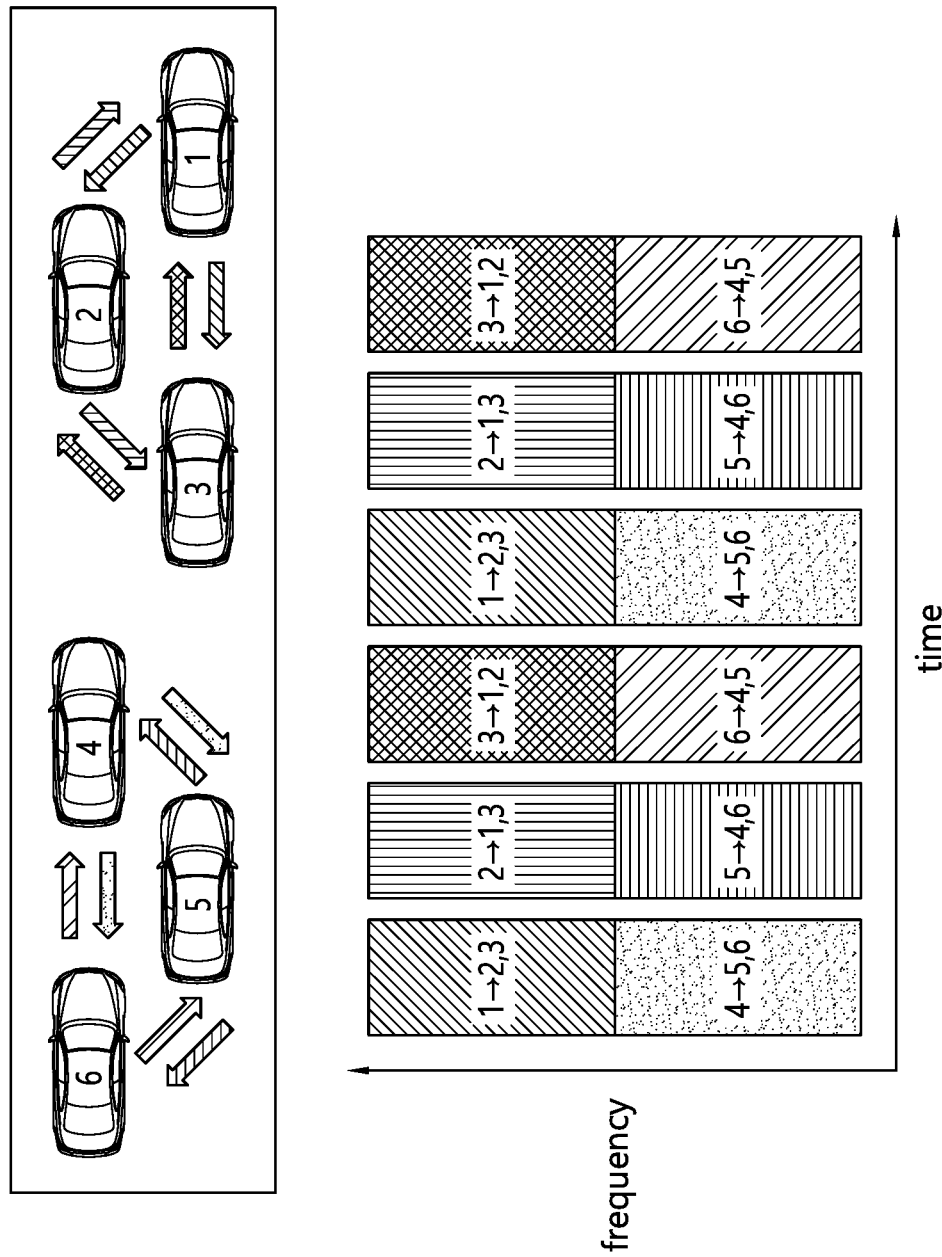
FIG. 7 shows an example of inter-vehicle communication to which SDD is not applied.
Figure 8:
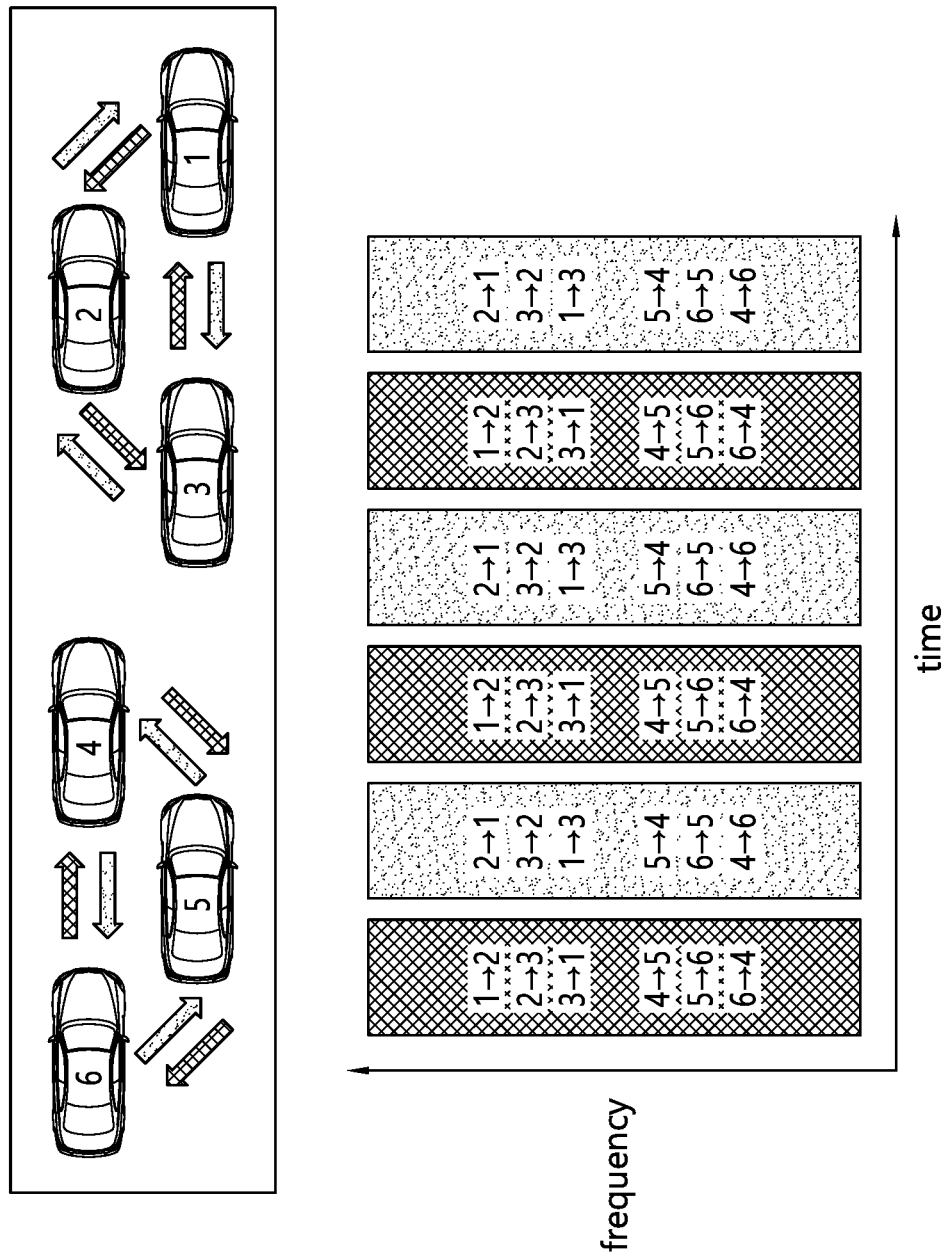
FIG. 8 shows an example of inter-vehicle communication to which SDD is applied.

When the SDD is applied to a plurality of UEs, there is an advantage in that transmission can be performed many times since more resources are used within a target time than the opposite case. FIG. 7 and FIG. 8 are examples of comparing a case of applying SDD and a case of not applying SDD.

FIG. 7 shows an example of inter-vehicle communication to which SDD is not applied. FIG. 8 shows an example of inter-vehicle communication to which SDD is applied.

When the SDD is not applied as shown in FIG. 7, a UE transmits signals simultaneously to different UEs in a multiplexed manner. If three UEs intend to establish a communication link with each adjacent UE as shown in FIG. 7, one transmission resource and two reception resources shall be allocated to each UE.

If the SDD is applied as shown in FIG. 8, since the UE needs to constitute one transmission resource and one reception resource for each communication link, the number of times of performing signal transmission may be greater in a unit time. In case of applying the SDD, a frequency resource allocated to the UE shall be shared with adjacent UEs which simultaneously transmit signals. If the SDD is applied, since a transmission signal of each UE is spatially divided, the same frequency resource can be used, thereby increasing the frequency resource used by each communication link.

In addition to the aforementioned advantage, since a receiving UE of each communication link receives a signal by using a narrow reception beam, a probability of being affected by jamming is decreased. In addition, since there is a high probability that an adjacent vehicle blocks a signal, jamming from a far distance is difficult. There is another advantage in that resource management complexity of a BS is decreased since the BS does not have to perform management so that inter-communication group resource and intra-communication group resource are resources orthogonal to each other. In TR 22.886, a scenario is included in which 15840 vehicles are present per one mile. In this case, complexity of the BS is too increased for the BS to manage each communication link between vehicles. When the SDD is applied, since only a transmission time point and a reception time point are to be determined between UEs included in the communication link, there is an advantage in that the complexity of the BS is decreased.

Hereinafter, a V2X use case for an automated vehicle is described.

<Scenario 1: Overtaking Maneuver Scenario>

Figure 9:
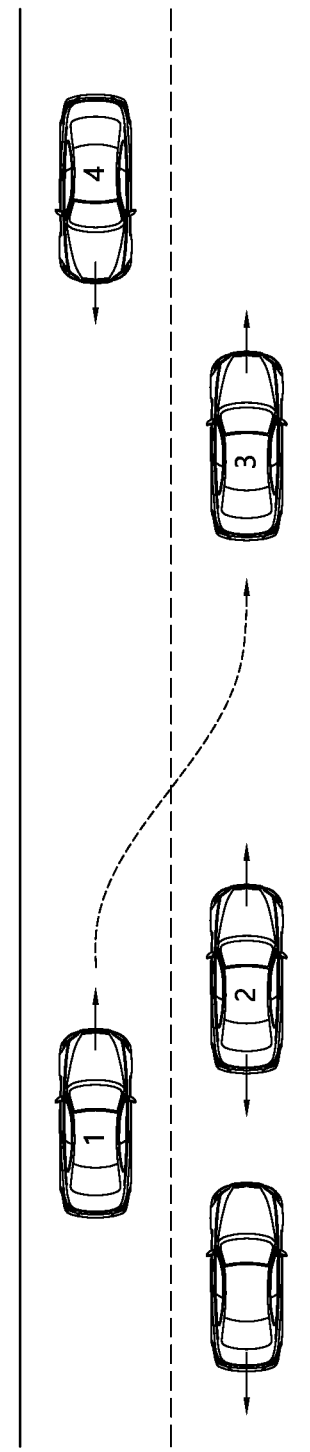
FIG. 9 shows an automated overtaking maneuver scenario in vehicle to everything (V2X) communication for an automated vehicle.

FIG. 9 shows an automated overtaking maneuver scenario in V2X communication for an automated vehicle.

Referring to FIG. 9, an automated vehicle 1 attempts to overtake another vehicle 2. During this attempt, an unpredictable change or deviation from the predicted trajectory may happen. It may come from the change of nearby vehicle's behavior or the appearance of animal and other objects on the road.

An overtaking maneuver has been planned with certain granularity and agreed upon by neighboring vehicles. The accuracy of the overtaking maneuver depends on the granularity (i.e. The size of discrete grid elements) of trajectories. If an unexpected road situation happens, a new joint solution needs to be negotiated quickly to avoid collisions. This needs to be completed before the vehicles enter the next grid element of the trajectory.

A road with a lane of width 3.5 m and a trajectory accuracy of 0.3 m is assumed in the present scenario. It is also assumed that vehicles on the road move with the speed of 30 m/s (108 km/h). In this case, each vehicle is passing a grid element every 10 ms.

If an unexpected road situation happens, a new plan has to be established in order to avoid an accident. A consolidated agreement on road trajectories requires at least three types of messages: a set of offered trajectories from each involved vehicle, an evaluation of all options, and an acknowledgment message. Each communication step needs to be completed within 3.3 ms, neglecting the computational requirements of each step.

<Scenario 2: Cooperative Perception Scenario>

Autonomous driving systems are based on the environmental information obtained via its own sensors. In reality, however, a vehicle cannot obtain the complete scene of the road and surrounding environment because of large trucks or busses blocking its view. Besides this, autonomous vehicles are expected not only to exchange the local awareness information between each other but also to be able to detect numerous features of surrounding environment by means of various sensors and cameras.

Cooperative active safety systems can warn drivers of dangerous situations and intervene through automatic braking or steering if the driver is unable to avoid an accident. Cooperative driving applications, such as platooning (road-trains) and highly automated driving can reduce travel time, fuel consumption, and CO2 emissions and also increase road safety and traffic efficiency. Moreover, not only cooperation between vehicles or between vehicles and infrastructure is required, but also the cooperation between vehicles and vulnerable road users, e.g. pedestrians and cyclists, through their mobile devices, such as smartphone and tablets, will be an important key element to improve traffic safety. C-ITS systems rely on timely and reliable exchange of information. Common to most applications are real-time requirements, and strict requirements on reliability and availability, especially when considering high mobility and large message sizes.

In addition, in the traffic scenario, the front vehicle could provide the real-time video data to the rear vehicle on as-needed basis in complex driving situation such as an automatic overtaking maneuver. Usual values for commercial video encoders are in the range of 100 ms. Thus, the video is assumed to be transmitted in raw format to avoid encoding and decoding delays and be used in real time for driving purpose. The camera capabilities shall be sufficient for feature extraction suitable for future autonomous driving task. Assuming gray-scale video with a resolution 1280×720 pixels and a refresh state of 30 fps, a data rate of 220 Mbps is required.

In addition, end-to-end latency requirements of less than 5 ms for message sizes of about 1600 bytes need to be guaranteed for all V2X transmissions. Data is sent either event-driven or periodically with a rate of about 10 Hz. Relative speeds of up to 500 km/h are possible on high-speed highways. Periodic broadcast traffic consist of at least 1600 bytes with repetition rate of 1-50 Hz for transmission of information related to objects resulting from local environmental perception and the information related to the actual vehicle.

<Scenario 3: Platooning Scenario with/without Leading Vehicle>

Use case 3-1 (platoon with leading vehicle): Vehicles properly arranged in platoons with enabled automated control of their speed and steering allow to reduce fuel consumption, increase safety, improve road congestion and increase driver convenience. For obtaining true benefit from platooning, each vehicle in platoon must be equipped with certain communication technology to exchange real-time information about a change of platoon's common parameters, such as acceleration, breaking, change of trajectory, etc. Also, the vehicles have to follow each other as near as possible for the improvement of road congestion and optimal fuel consumption, but on the other hand, close spacing leads to higher risk of collision and requires very strict latency and reliability constraints.

Use case 3-2 (platoon without leading vehicle): In a multi-lane convoy use case, a leading vehicle, centralized controller, or supervisor does not exist. Instead, the vehicle control, in both lateral and longitudinal directions, is distributed over all members of the convoy (see FIG. 9). The result of this approach is that vehicle disturbances, such as a braking vehicle, affect all members of the convoy to a greater or lesser extent, resulting in a stable formation.

Figure 10:
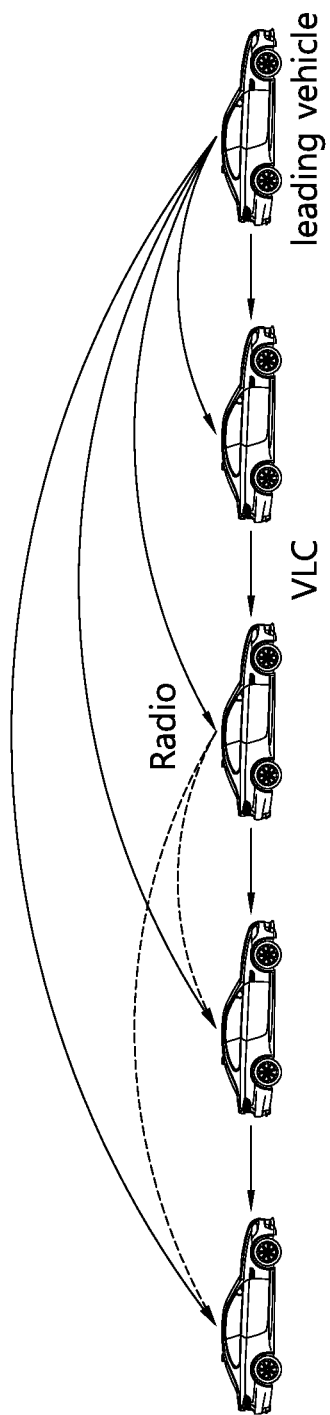
FIG. 10 shows a platoon scenario in V2X communication for an automated vehicle.

FIG. 10 shows a platoon scenario in V2X communication for an automated vehicle.

Scenario 3-1 (braking): It is assumed that each vehicle participated in a platoon has an advanced brake control to compensate for variances in vehicle load, road properties, and the brake system. The brake controller is imperfect so that the imperfection is modelled by additive Gaussian noise of a given variance. The probability of accident is approximately $10^{-6}$ when the variance of the brake controller is $10^{-4}$, vehicles in a platoon moves at speed of 23 m/s, the distance between vehicles is 4.5 m and the packet is successfully delivered at the first transmission. Thus, it can be seen that very low packet error rate (e.g. less than $10^{-6}$) is desirable.

Scenario 3-2 (platoon's common parameter+video data for cooperative perception): The leading vehicle in a platoon transmits platoon's common parameter to the following vehicles via a carrier 1. Also, its video data is delivered with/without platoon's common parameters to the rear vehicles in a multi hop fashion via a carrier 2. Usually, the carrier 2 has much higher frequency than the carrier 1. For example, DSRC and LTE V2V can be used as the carrier 1 and mmWave and visible light communication (VLC) can be used as the carrier 2. The carrier 1 has less propagation loss than the carrier 2 so that the carrier 1 can deliver platoon's common parameter to the last vehicle in the platoon within a short latency. However, the carrier 1 is vulnerable to radio jamming attacks and the areal spectral efficiency and data rate of the carrier 1 are lower than those of the carrier 2.

Scenario 3-3 (platoon without leading vehicle: convoy): In order to maintain small inter-vehicle distances, convoy members rely on the high-frequency exchange of up-to-date and high-quality vehicle dynamics data among vehicles in the convoy. The convoy control algorithm requires just the vehicle dynamics information of neighboring vehicles, instead of the information of all convoy members. As such, the algorithm scales well to large convoys and converges easily to a desired formation when vehicles join and leave the convoy.

Scenario 3-4: In addition to the scenario 2, I2V link or V2I2V link can be used to deliver verified information to vehicles in a platoon. Infrastructures collect information from its sensors and vehicles and forward it to a server. The server filters trumped-up and fabricated information. For example, the server could drop the information collected from vehicles in the black list. The server sends the filtered information to infrastructures and infrastructures forward the filtered information to vehicles in a platoon.

However, there is a possibility of signal blocking according to the aforementioned scenario. Reliability and low-latency of inter-vehicle communication are very important in a service such as a platoon or convoy described in the scenario 3. However, it is expected that a distance between vehicles is at least 4.5 m, and in general, a vehicle interval is set to about 6 to 8 m due to instability of a brake control device, a communication latency, or the like. When the vehicle interval is increased, any vehicle not belonging to the platoon may cut in between platoon groups to overtake. In this case, reliability of communication between platoon groups may deteriorate due to the cut-in vehicle. Summarizing terminologies, the platoon corresponds to a group of vehicles which are driven in a single lane, and autonomous driving is not necessary. The convoy corresponds to a group of vehicles which are driven in several lanes, and is used when the vehicle is automatically driven.

In addition, V2X communication is limited in an LTE system. Since a vehicle may cut in at any section of a platoon in the above scenario, a UE which blocks a signal may be any UE in a communication group. Therefore, in order to solve the aforementioned problem, any UE in a group shall be capable of relaying a signal transmitted by any UE. In the ongoing 3GPP V2X study item, studies are being conducted mainly on periodic signal broadcasting between vehicles, and a problem for the scenario cannot be solved by simply applying a corresponding result.

In addition, communication with low-latency and high-reliability is being proposed as a requirement for 5G V2X. For example, according to 3GPP TR22.886, in case of collective perception, it is necessary to transmit data to a vehicle in the range of 200 m with reliability of 99.999% within 3 ms, and in case of emergence trajectory, it is required to transmit data to a vehicle in the range of 500 m with reliability of 99.999% within 3 ms.

When the information is transmitted to the vehicle in the range of 500 m, there is a probability that the vehicle blocks a signal. Therefore, it is possible to consider a method of transferring a signal far away using multi-hop communication between vehicles. However, in multi-hop communication, a delay increases with the increase in the number of hops. This makes it difficult to transfer a signal within 3 ms. Therefore, a technique is needed to minimize the increase in the delay even if the number of hops increases.

Accordingly, a method of transmitting a relay signal for V2X communication capable of solving the above problem and necessity will be described hereinafter.

Figure 11:
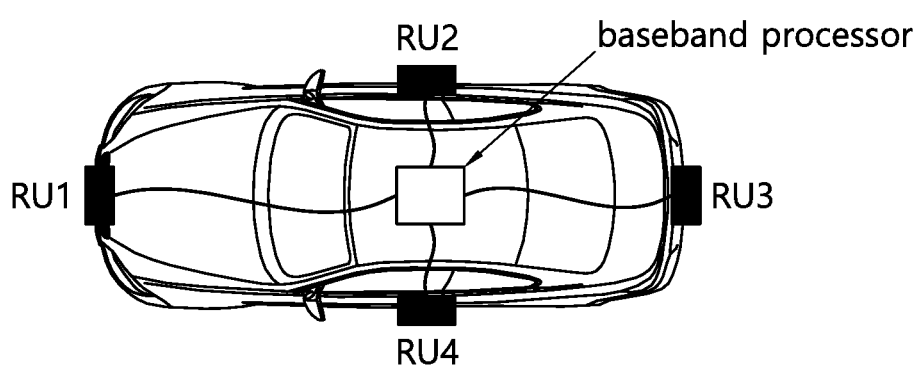
FIG. 11 shows an example of deploying a baseband processor and a radio unit (RU) in a vehicle which performs V2X communication.

FIG. 11 shows an example of deploying a baseband processor and an RU in a vehicle which performs V2X communication.

In the present specification, a radio unit (RU) may consist of one or multiple physical antennas, and one RU may have one or multiple antenna ports. The RU may simply have only a function of an RF module. When the RU simply has only the function of the RF module, the RU is the same as an antenna. In addition thereto, if the RU has only one antenna port, a single RU is the same as a single antenna port. The RU may include not only the function of the RF module but also the part or entirety of an L1 function or up to the part of an L2/L3 function.

In the present specification, the UE also includes a vehicle having a communication module installed therein, in addition to the existing mobile phone and smart phone. Referring to FIG. 11, the UE may have multiple RUs (RU 1, RU 2, RU 3, RU 4, . . . ). In addition, it can be seen that the multiple RUs are connected to a baseband processor.

In the present specification, a subframe is a time unit of a physical layer, and may be replaced with a time duration, a transmission time duration, a slot, a transmission unit (TU), or the like. In addition, a road side unit (RSU) described in the present specification may be a UE-type RSU or a BS-type RSU.

For example, when n vehicles constitute one platoon group, one communication group may be constituted by aggregating the n vehicles and an adjacent BS (herein, n is a natural number). For another example, all vehicles in a cell and a BS of the cell may constitute one communication group. In addition, one UE may belong to different communication groups at the same time.

Space division duplex communication described in the present specification implies not only communication in which an RU 1 and RU 2 of a UE 1 simultaneously transmit/receive signals but also communication in which the RU 2 can receive a signal while the RU 1 performs transmission or the RU 1 can receive a signal while the RU 2 transmits a signal. For this, the RU 1 and the RU 2 may be considered as a separate transmission and reception unit (TXRXU).

Although an entity for scheduling communication between UEs is described as a BS in the present specification, the BS may be replaced with an RSU or a UE-type RSU or a cluster head UE which is in charge of communication between the UEs.

A case where a UE is capable of configuring a beam group is assumed in the present specification. In the present specification, the beam group implies a unit by which the UE can independently perform transmission or reception. That is, a different beam group has a separate TXRXU. If self-interference between TXRXUs included in different beam groups is less than or equal to a specific value or can be decreased to be less than or equal to the specific value by using a self-interference canceller, the UE can transmit a signal in a beam group 2 while receiving a signal in a beam group 1. In addition, the beam group may be configured such that a Tx beam group and an Rx beam group are the same as or different from each other.

The beam group may correspond to the TXRXU in a one-to-one or one-to-many manner. That is, when the UE has N TXRXUs, the UE may construct N or less beam groups. In addition, the beam group may consist of one or more analog beams. For example, if the UE has N TXRXUs and analog beamforming is not applied to each TXRXU, the UE may have N beam groups and each beam group may consist of one beam. In this case, the beam group is the same as the TXRXU. For another example, if the UE has N TXRXUs and analog beamforming is applied to each TXRXU, the UE may have N beam groups and each beam group may consist of multiple beams.

Figure 12:
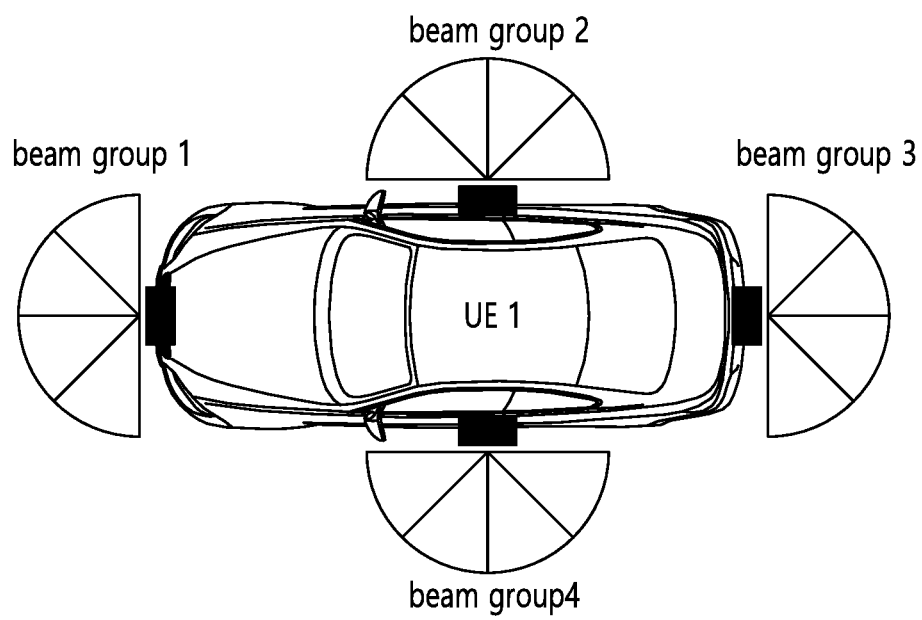
FIG. 12 shows an example of constituting a beam group for V2X communication.
Figure 12:
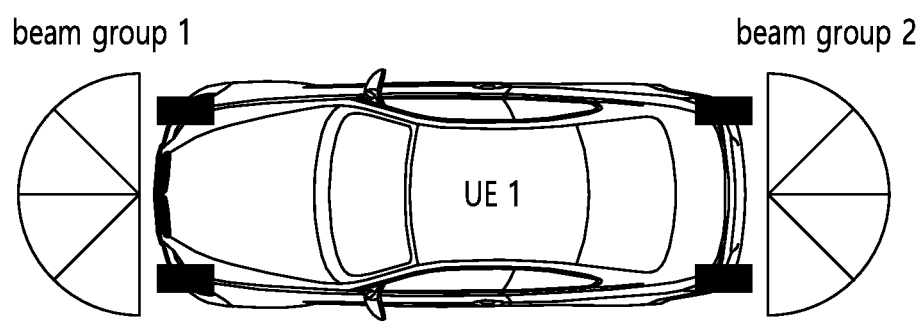
Figure 13:
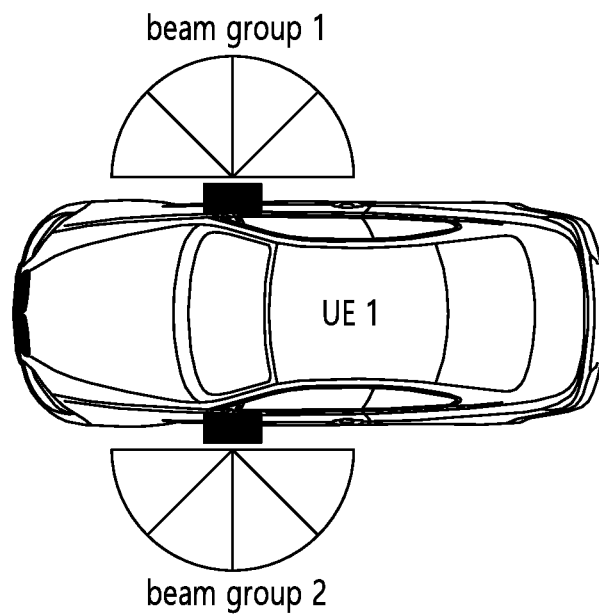
FIG. 13 shows another example of constituting a beam group for V2X communication.
Figure 13:
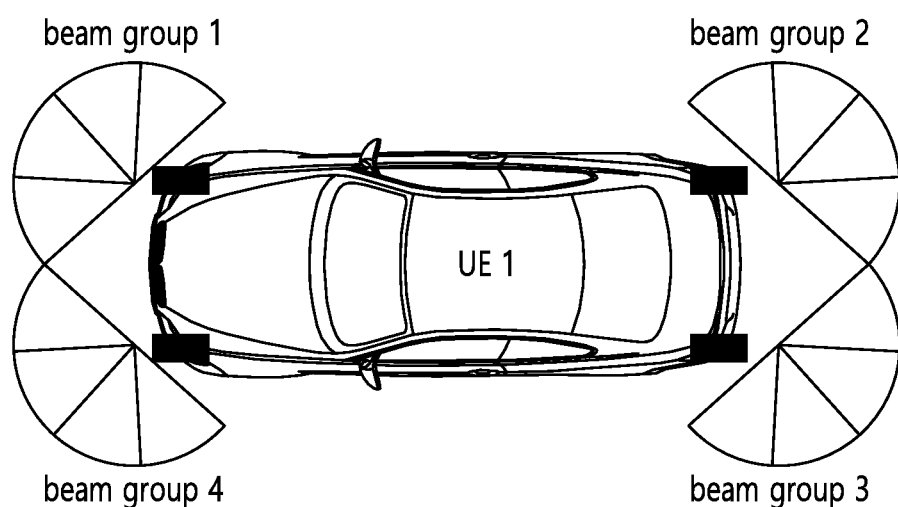

FIG. 12 and FIG. 13 are examples of constructing a beam group when each RU has a separate TXRXU. In FIG. 12 and FIG. 13, a fan-shaped portion indicates a single beam, and implies a case where one beam group consists of four beams.

FIG. 12 shows an example of constituting a beam group for V2X communication.

In an upper end of FIG. 12, a UE 1 has four beam groups, and four TXRXUs are located in front, rear, and both sides of a vehicle. In a lower end, the UE 1 has two beam groups, and four TXRXUs are located only in front and rear of the vehicle.

FIG. 13 shows another example of constituting a beam group for V2X communication.

In an upper end of FIG. 13, a UE 1 has two beam groups, and two TXRXUs are located only in both sides of a vehicle. In a lower end of FIG. 13, the UE 1 has four beam groups, and four TXRXUs are located at corner portions in front and rear of the vehicle.

In what follows, the present specification aims to propose an interference measurement procedure by which a terminal having a plurality of radio units (RUs) receives a signal from a specific RU while transmitting a signal through other RU; and signaling related to the procedure. In particular, the present specification takes into account a case where interference exists between RUs, and an analog interference canceller capable of removing the interference is included in the RU.

Figure 14:
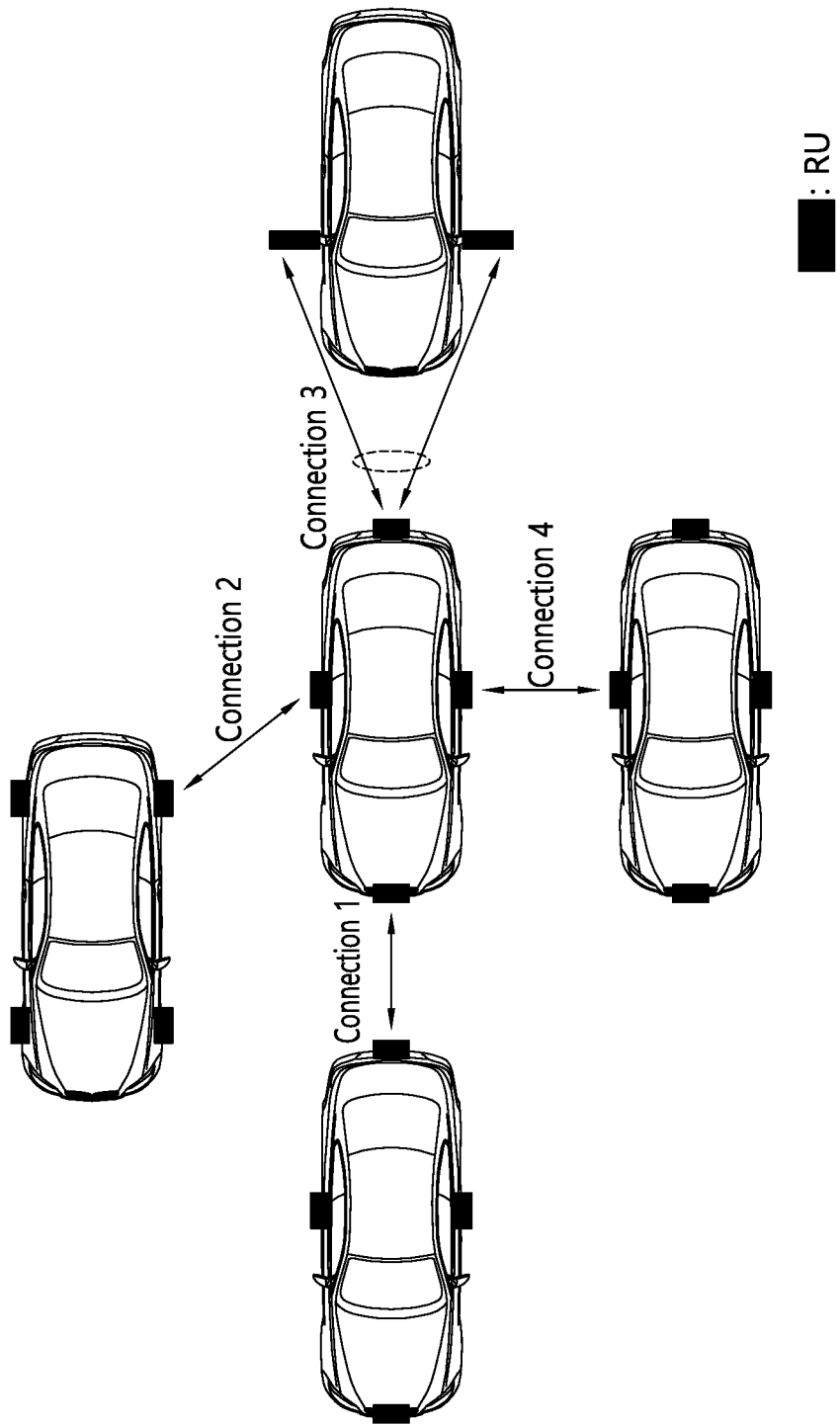
FIG. 14 shows one example where a plurality of communication connections is established among vehicles having a plurality of RUs.

FIG. 14 illustrates one example where a plurality of communication connections are established among vehicles having a plurality of RUs.

To provide services such as platooning, convoy, and cooperative maneuver assistance described above, a vehicle needs to establish a communication connection to other vehicles in its front, back, left and right sides as shown in FIG. 14. Therefore, a vehicle which has received the corresponding service forms a plurality of V2V links. Also, for a service such as platooning or convoy described in the scenario 3, it is important to achieve high reliability while satisfying a delay of about 3 ms.

The current LTE V2V communication has been developed to broadcast information of a vehicle in the surroundings thereof, and standardization of V2V connection establishment for unicast has not been carried out. Moreover, since it is important to transmit a signal in all directions for broadcasting, V2V communication technology has been developed under an assumption that a vehicle is equipped with a single RU having omni-antenna characteristics; however, it is expected that vehicles equipped with a plurality of RUs with directivity will be introduced in a near future. As shown in FIG. 14, if vehicle establishes a plurality of V2V communication connections, it is expected that a vehicle equipped with a plurality of RUs will have an advantage in terms of communication delay and capacity, technology development is needed, which enables a vehicle with a plurality of RUs to establish a plurality of communication connections. Besides, as shown in FIG. 14, if a vehicle equipped with a plurality of RUs performs an operation of transmitting a signal through a specific RU while receiving a signal from other specific RU, an advantage is obtained that signals may be transmitted within a shorter time period.

According to the present specification, an RU may be composed of one or more physical antennas, and one RU may have one or more antenna ports. An RU may provide only the function of a simple RF module or provide the whole or part of L1 function. Also, an RU may include part of L2/L3 function. If an RU has one antenna port and provides only the function of an RF module, a single RU is the same as a single antenna port. Therefore, an RU according to the present specification may be substituted by an antenna port group, antenna port, or antenna module.

In the present specification, a terminal includes a vehicle equipped with a communication model in addition to an existing mobile phone and smartphone, and the terminal may have a plurality of RUs. In the present specification, a subframe is a time unit of the physical layer and may also be called a time interval, transmission time interval, slot, or transmission unit (TU).

Space division duplex communication according to the present specification refers to such kind of communication by which not only RU1 and RU2 of a terminal may transmit and receive a signal simultaneously but also RU2 may receive a signal while RU1 transmits a signal or RU1 may receive a signal while RU2 transmit a signal. Also, a road side unit (RSU) in the present specification may be an RSU in the form of a terminal or an RSU in the form of a base station.

Space division duplex communication according to the present specification refers to such kind of communication by which not only RU1 and RU2 of a terminal may transmit and receive a signal simultaneously but also RU2 may receive a signal while RU1 transmits a signal or RU1 may receive a signal while RU2 transmit a signal. To this purpose, RU1 and RU2 may be regarded as a separate transmission and reception unit (TXRXU).

The present specification is to propose a method for efficiently using a radio resource by configuring a resource for device-to-device communication and an uplink resource to be shared.

When a base station always allocates a resource for unicast signal transmission in a sidelink (SL), a large number of signaling times are required for scheduling. There is a representative case where UE 1 requests resource allocation from the base station in order to transmit a signal to UE 2. In this case, a minimum number of signaling times illustrated below are required. UE 1 transmits a signaling request to the base station (signaling 1), the base station instructs UE 2 to receive a signal from UE 1 (signaling 2) and then allocates a resource for signal transmission to UE 1 (signaling 3). On the contrary, when UE 1 can transmit a signal directly to UE 2, this signaling procedure is not necessary, or a signal indicating signal transmission by UE 1 may be transmitted along with data.

When the number of signaling times increases, preprocessing time for signal transmission between UE 1 and UE 2 increases. If the UE fails to receive any signal in a signaling procedure for preprocessing, signal reception fails, thus reducing reliability. In communication between adjacent vehicles, since a channel between UE 1 and UE 2 has better quality than a channel between the UE and the base station, the reliability is further reduced due to coordination by the base station. In addition, in a frequency band of 6 GHz or higher, a channel between a base station and a UE is likely to have more serious signal blocking than a communication channel between UEs. Therefore, a method of performing device-to-device communication without coordination by a base station enables signal transmission with high reliability within a short time. Accordingly, it is required to transmit a unicast signal without coordination by the base station.

When the base station does not manage a resource for device-to-device unicast communication every signal transmission, a method of allocating a resource pool for device-to-device unicast communication may be applied. If traffic of device-to-device unicast communication is event-triggered traffic, it is inefficient to allocate time/frequency resources with a short period for a resource pool for the unicast communication. This inefficiency grows as a smaller number of UEs requires unicast communication. Therefore, a method of sharing a resource pool for device-to-device unicast communication with a different resource (e.g., a UL resource, a DL resource, or an SL resource for broadcast) may be applied.

That is, since a sidelink broadcast signal or sidelink discovery signal requires a dedicated resource but a device-to-device unicast signal is aperiodically transmitted only when traffic occurs, a sidelink resource may be used overlapping with a different resource.

When a resource pool for device-to-device unicast communication is shared with a different resource, interference between signals may occur. For example, when an uplink resource and the resource pool share a time/frequency resource, unintended interference may occur to an uplink signal. To reduce this interference, it is possible to spatially divide the time/frequency resource shared between the uplink resource and the resource pool.

Therefore, the present specification proposes a method for spatially dividing a time/frequency resource when an uplink resource and a resource pool for device-to-device unicast communication share the time/frequency resource.

Figure 15:
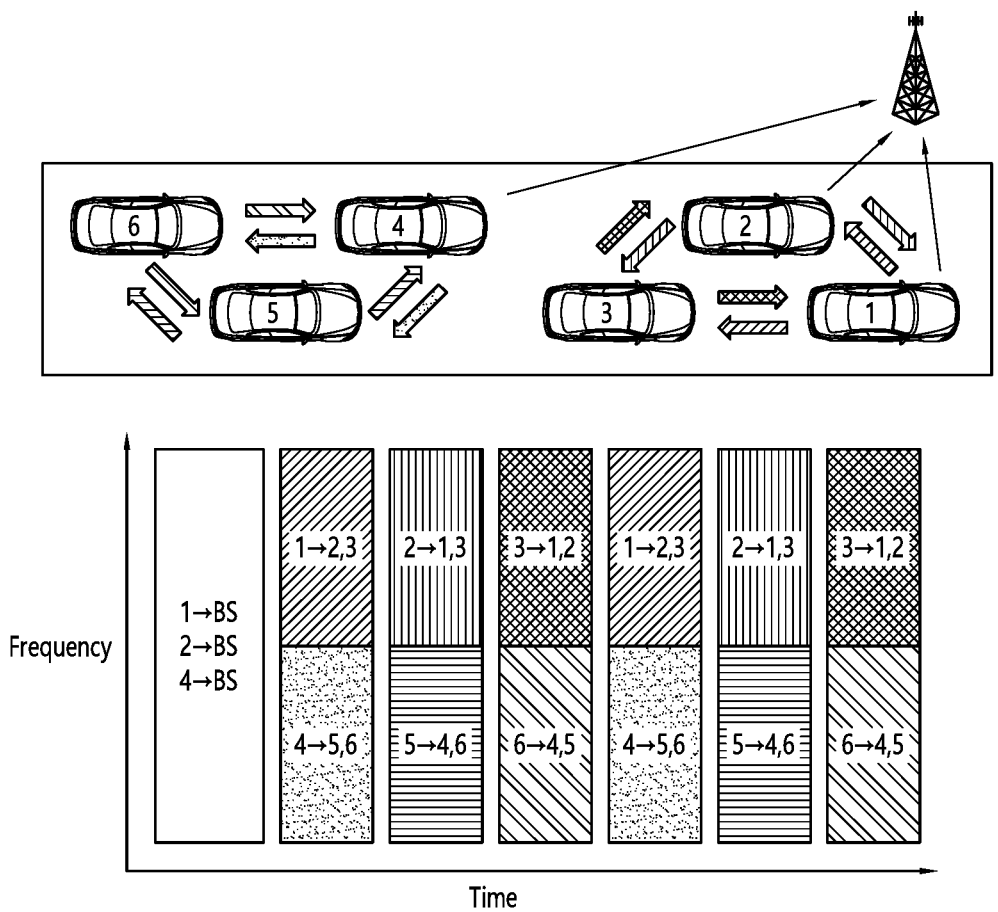
FIG. 15 shows an example of inter-vehicle communication to which SDD is not applied when a sidelink and an uplink share time/frequency resources.
Figure 16:
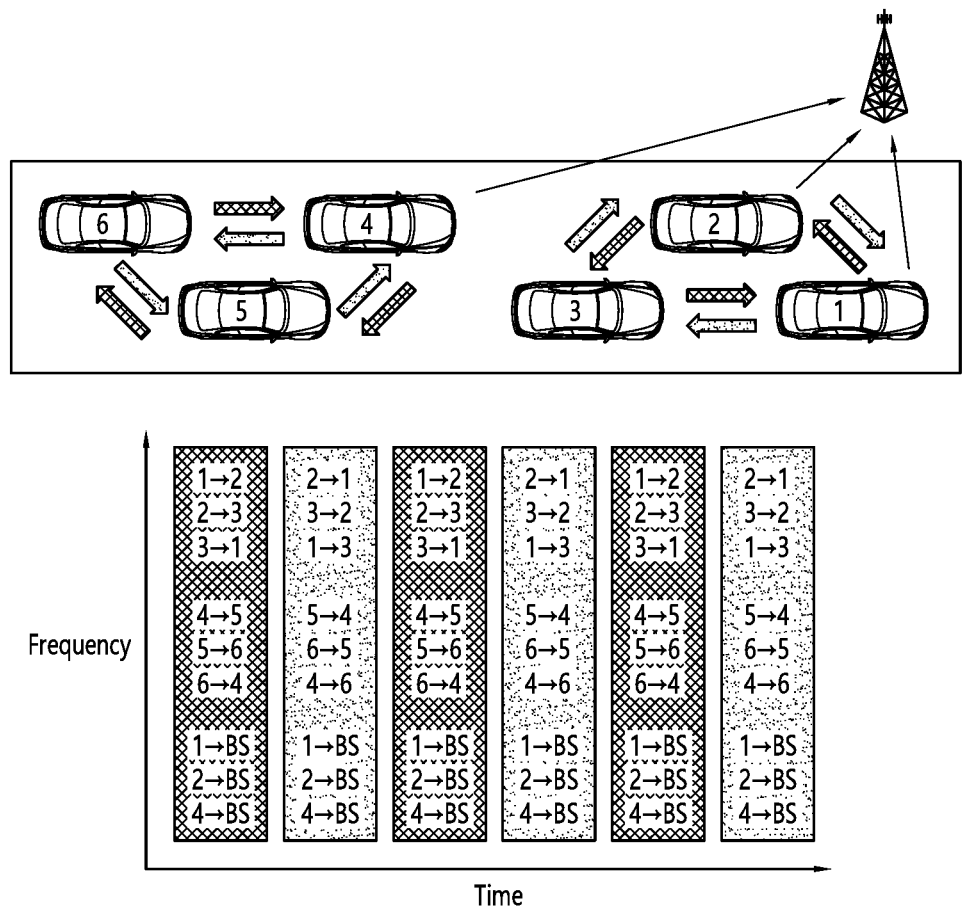
FIG. 16 shows an example of inter-vehicle communication to which SDD is applied when a sidelink and an uplink share time/frequency resources.

FIG. 15 shows an example of inter-vehicle communication to which SDD is not applied when a sidelink and an uplink share time/frequency resources. FIG. 16 shows an example of inter-vehicle communication to which SDD is applied when a sidelink and an uplink share time/frequency resources.

FIG. 15 and FIG. 16 illustrate examples in which a sidelink and an uplink share time/frequency resources. In FIG. 15 and FIG. 16, vehicles 1, 2, and 3 and vehicles 4, 5, and 6 form one communication group and exchange signals with each other. In addition, vehicles 1, 2, and 4 are allocated a resource for signal transmission via an uplink. In FIG. 15 and FIG. 16, 1→2, 3 means that vehicle 1 transmits signals to vehicles 2 and 3 via multiplexing, and 1→BS means that vehicle 1 transmits an uplink signal to a base station. When SDD is not applied (FIG. 15), respective communication links are allocated time/frequency resources orthogonal to each other. When SDD is applied (FIG. 16), communication links share time/frequency resources with each other and also share the resources with an uplink.

In this situation, the present specification illustrates embodiments for reducing interference between an uplink and a sidelink as follows.

Figure 17:
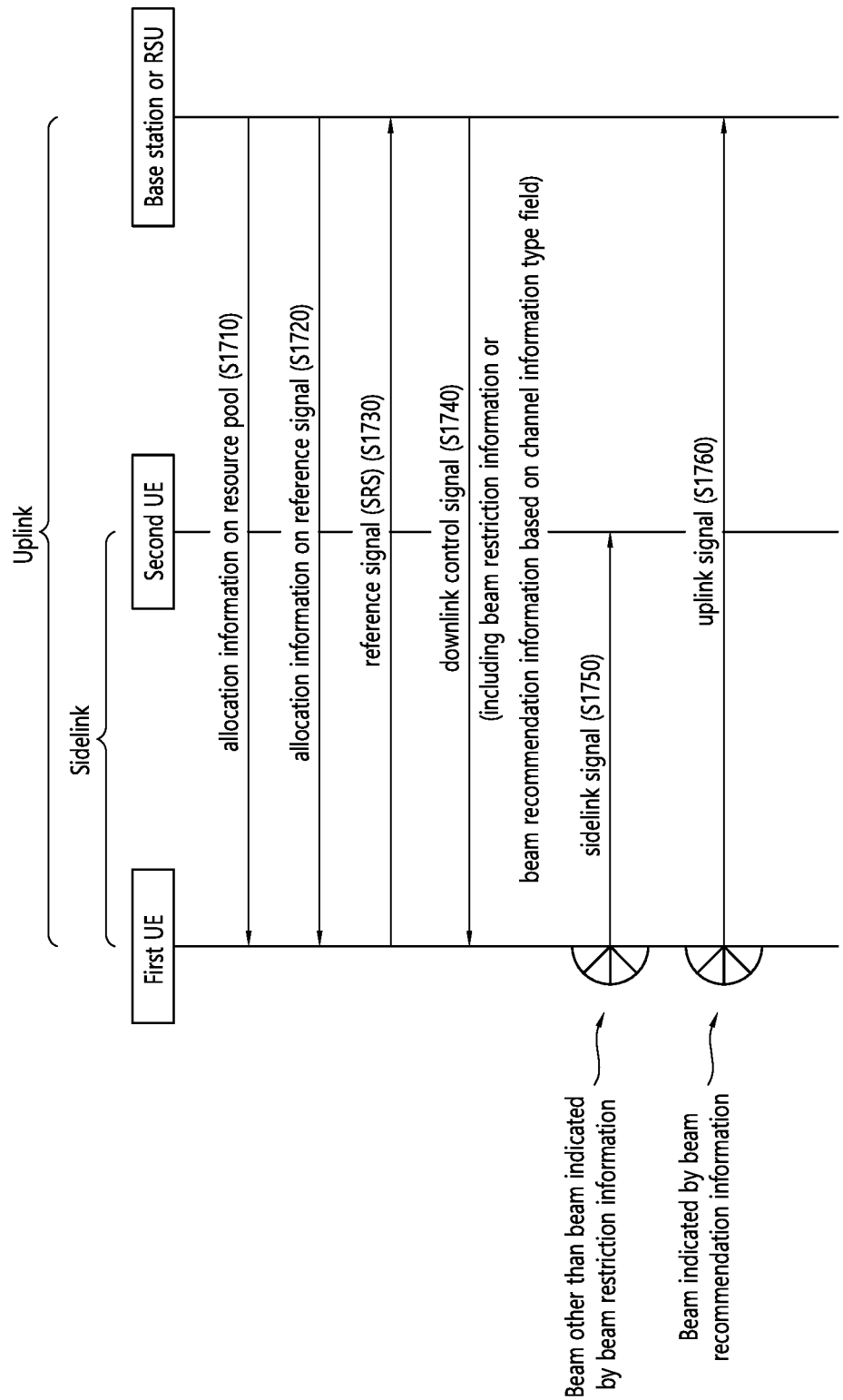
FIG. 17 shows a procedure for performing device-to-device communication by sharing an uplink resource and a sidelink resource according to an embodiment of the present specification.

FIG. 17 shows a procedure for performing device-to-device communication by sharing an uplink resource and a sidelink resource according to an embodiment of the present specification.

Proposed Method 1

A base station may configure some or all of time/frequency resources (e.g., a resource pool) for device-to-device unicast communication to be shared or overlap with UL time/frequency resources, DL time/frequency resources, and/or time/frequency resources allocated for SL broadcast or discovery (S1710). To this end, the base station may transmit a cell-common or UE-specific signal for allocating the resource pool via a physical signal or an upper-layer signal.

An information field for specifying the time/frequency resources (resource pool) for device-to-device unicast communication via the physical layer or the upper-layer signal may be configured as follows. For example, the information field may be for specifying a time/frequency resource in a subframe, a slot, or a mini-slot. In another example, the information field may be for specifying a time/frequency resource in an SL resource, a UL resource, and/or a DL resource. Specifically, when the resource pool for device-to-device unicast communication is allocable for both an uplink resource and a sidelink resource, the uplink resource is allocated in OFDM symbols $n_1, n_2, \ldots, n_{UL}$ in a subframe, and the sidelink resource is allocated in OFDM symbols $m_1, m_2, \ldots, m_{SL}$ in the subframe, the information field for allocating the resource pool is configured including both OFDM symbols $n_1, \ldots, n_{UL}$ and OFDM symbols $m_1, \ldots, m_{SL}$.

Even though numerology applied to the time/frequency resources for device-to-device unicast communication is different from that for a DL or UL, resources may be shared. In this case, the information field for allocating the time/frequency resources for device-to-device unicast communication is generated on the basis of the numerology applied to device-to-device unicast communication. Here, numerology may correspond to various numerical values available for a next-generation wireless communication system for high reliability and low latency. For example, numerology may be the length of a subframe (TTI length), subcarrier spacing, the number of symbols of a subframe, and/or a CP length.

The base station instructs a UE to transmit a reference signal (e.g., sounding reference signal (SRS)) via a UE-specific physical-layer or upper-layer signal (S1720). The signal may include information about an antenna port for transmitting a reference signal and/or an indicator indicating the type of channel information that the base station subsequently transmits to the UE via a downlink control channel along with information about time, a frequency, and/or a sequence resource and/or transmission power for transmitting the reference signal. Alternatively, the signal may be a physical-layer signal, and the channel information indicator may be transmitted via a higher-layer indicator. The UE transmits a reference signal to the base station on the basis of the signaled information (S1730).

As an example of the type of channel information, information about a beam not to be used by the UE in order to reduce interference in an uplink when transmitting a sidelink signal (beam restriction information) may be transmitted (S1740). Alternatively, information about a beam that the UE preferably uses when transmitting an uplink signal (beam recommendation information) may be transmitted (S1740). The UE may transmit a sidelink signal using a beam other than the beam indicated by the beam restriction information (S1750). In addition, the UE may transmit an uplink signal using the beam indicated by the beam recommendation information (S1760).

Alternatively, information about a beam that the UE preferably uses when transmitting an uplink signal may be transmitted together with information about a beam not to be used by the UE in order to reduce interference in an uplink when transmitting a sidelink signal. In another example, information about a beam that the UE preferably uses in order to reduce interference in an uplink when transmitting a sidelink signal may be transmitted. Alternatively, information about a beam that the UE preferably uses when transmitting an uplink signal may be transmitted together with information about a beam that the UE preferably uses in order to reduce interference in an uplink when transmitting a sidelink signal. In the embodiment, the information about the beam may include a beam index indicating a beam direction and a beam size indicating transmission power.

In the embodiment, the information about the beam may be explicitly indicated or may be implicitly indicated. Alternatively, some of the information about the beam may be explicitly indicated, and some thereof may be implicitly indicated. For example, when the base station implicitly reports a beam direction to the UE, the base station may inform the time, frequency, and/or sequence index of the reference signal transmitted by the UE. For example, when reporting the transmission power of the beam to the UE, the base station may explicitly report the transmission power via a transmission power field.

The UE may identify information about a beam to be used or not to be used when performing device-to-device unicast signal transmission on the basis of the type of channel information received from the base station. For example, it is assumed that the UE transmits an SRS in resource (1, n) using beam n via antenna port 1. When the base station transmits resource (1, 3) via channel information indicating a beam not to be used in device-to-device unicast signal transmission, the UE does not use beam 3 of antenna port 1 transmitted in resources (1, 3). In another example, when the base station transmits resources (1, 2) via channel information recommending a beam to be used in device-to-device unicast signal transmission, the UE performs device-to-device unicast communication using beam 2 of antenna port 1, or performs device-to-device unicast communication using a beam having a direction as similar as possible to that of the beam when it is difficult to select the beam. According to this embodiment, the UE may obtain information about an antenna port (or antennal panel or RU) to be used in transmission of a sidelink signal and information about the direction of an analog and/or digital beam in the port through channel information transmitted by the base station to the UE.

In another example, when transmitting sidelink beam restriction information, beam direction restriction information and beam transmission power may be transmitted. In this case, the UE may transmit a signal via a beam with a restricted direction but may transmit the signal only with power lower than the transmission power restricted by the base station. In still another example, when transmitting sidelink beam recommendation information, beam direction recommendation information and beam transmission power may be transmitted. Here, the beam transmission power may be the maximum power that can be used when transmitting a signal in a recommended direction. In yet another example, when UL beam recommendation information is transmitted along with sidelink beam restriction information or sidelink beam recommendation information, if beam transmission power is transmitted for a UL beam, information about the beam may indicate the transmission power of a signal used for UL transmission.

A physical-layer control signal (e.g., DCI) including the channel information transmitted from the base station to the UE may be transmitted even when uplink scheduling is not performed for the UE (S1740).

The channel information may be used to reduce uplink interference by the device-to-device unicast communication in the UE or a neighboring UE. In this case, it is necessary to transmit the channel information even when the UE does not perform uplink signal transmission. Using this characteristic, the UE operation may be changed as follows according to whether scheduling field information is NULL.

When the UE receives a downlink control signal (e.g., DCI) for uplink signal transmission but the scheduling field information is NULL, the UE determines that sidelink beam restriction information or sidelink beam recommendation information is included in the channel information transmitted by the base station. Further, uplink beam recommendation information may also be transmitted. This information may include a beam direction and beam transmission power.

For example, when the base station does not perform scheduling for the UE, resource allocation information, MCS information, redundancy version information, retransmission process ID (PCID) information, and new data indicator (NDI) information among the DCI are not necessary. Therefore, when some or all of these information fields are set to NULL, the UE may determine that sidelink beam restriction information or sidelink beam recommendation information is transmitted. Here, the sidelink beam restriction information or the sidelink beam recommendation information may be transmitted in an information field previously used for uplink beam recommendation. Alternatively, information for uplink beam recommendation may be transmitted in the information field for uplink beam recommendation, and the sidelink beam recommendation information or the sidelink beam restriction information may be transmitted in an unoccupied information field among the information fields.

Similarly to the above embodiment, beam power information associated with a sidelink beam may be transmitted in an existing information field for setting the power of an uplink beam. Alternatively, an information field for indicating sidelink beam transmission power may be defined in an unoccupied field among the information fields.

In addition, a field for defining the type of channel information may be used in the downlink control signal. For example, a channel information type field of 0 may indicate uplink beam-related information, and a channel information type field of 1 may indicate sidelink beam-related information. Here, the sidelink beam-related information may be beam restriction information or beam recommendation information.

Since this method uses one more information field than the embodiment of setting the scheduling field to NULL, an information field for indicating a beam index is reduced. However, when setting the scheduling field to NULL is used for other purposes, it is preferable to apply this method. For example, when the channel information type field is 0, a beam direction information field includes beam direction information for uplink transmission; when the channel information type field is 1, the beam direction information field includes beam direction information for sidelink beam recommendation or restriction. In addition, when the channel information type field is 0, a beam transmission power information field may indicate transmission power in uplink transmission; when the channel information type field is 1, the beam transmission power information field may include beam transmission power restriction information in sidelink transmission.

An additional temporary identifier may be allocated to the UE in order to specify the type of channel information in the downlink control signal. For example, RNTI 1 and RNTI 2 may be allocated to the UE. Here, when a cyclic redundancy check (CRC) is masked with RNTI 1, uplink beam-related information may be transmitted; when the CRC is masked with RNTI 2, sidelink beam-related information may be transmitted.

This method has the advantage of not requiring an additional information field but has the disadvantage of requiring allocation of an additional RNTI resource. When there are a large number of vehicles but RNTIs are not enough, it is difficult to apply this method. For example, when the CRC is masked with RNTI 1, the beam direction information field includes beam direction information for uplink transmission; when the CRC is masked with RNTI 2, the beam direction information field includes beam direction information for sidelink beam recommendation or restriction. In addition, when the CRC is masked with RNTI 1, a beam transmission power information field may indicate transmission power in uplink transmission; when the CRC is masked with RNTI 2, the beam transmission power information field may include beam transmission power restriction information in sidelink transmission.

A resource via which the reference signal is transmitted may be an uplink resource and/or a sidelink resource.

Typically, an SRS resource is transmitted in an uplink resource. Therefore, a method of transmitting an SRS in an uplink resource may be considered. However, when an SRS is for measuring interference of a sidelink in an uplink, the SRS may be transmitted by obtaining an additional resource for a sidelink resource (S1710).

When the sidelink and the uplink have different numerologies and share time/frequency resources, the UE operates as follows. When a reference signal transmission resource for the UE is configured in an uplink resource, the UE may perform the following two operations.

Opt 1) The UE transmits a reference signal using uplink numerology.

Opt 2) The UE transmits a reference signal using sidelink numerology.

When a reference signal transmission resource for the UE is configured in a sidelink resource, the UE may perform the following two operations.

Opt 3) The UE transmits a reference signal using the sidelink numerology.

Opt 4) The UE transmits a reference signal using the uplink numerology.

The proposed method enables time/frequency resources to be shared even when the sidelink and the uplink have different numerologies. Opt 1 and Opt 4 of the embodiment have the effect of reducing the overhead of the base station, because the base station just needs to receive the SRS in view of only single numerology in an uplink SRS resource region. For example, filtering may be omitted. Opt 2 and Opt 3 have the advantage that numerology that the UE actually use to transmit a sidelink signal enables accurate measurement of sidelink interference.

A time/frequency resource for transmitting a reference signal (e.g., SRS) in a sidelink time/frequency resource (e.g., a resource pool) is allocated via a UE common signal. UEs in the resource pool do not transmit a signal other than the reference signal in the resource. The resource may be allocated semi-statically or dynamically. Subsequently or simultaneously, the base station may periodically or aperiodically instruct each UE to transmit a reference signal via a UE-specific signal.

Since the UEs transmitting the reference signal mostly perform communication only via a sidelink, if both an uplink UE and a sidelink UE transmit an SRS only in an uplink resource, overhead for SRS transmission in an uplink may be large. Therefore, it is necessary to allocate a resource for SRS transmission in a sidelink. In addition, if signal transmission in a sidelink resource has an ad-hoc feature of not being controlled by a network, it is necessary to allocate a resource for SRS transmission via a UE-common signal so that an SRS does not receive interference by different signal transmission. Then, the base station may request an indication from UEs to be instructed to transmit an SRS.

In an OFDM symbol transmitting the SRS resource, a sidelink broadcast signal may be transmitted or an RACH zone for a sidelink UE and/or a scheduling request (SR) resource for a sidelink UE may be defined.

Proposed Method 2

A base station instructs UE 1 to transmit a reference signal (e.g., an SRS) via signal 1 and instructs UE 2 to receive a reference signal in a specific resource via signal 2. Signal 1 may include antenna port information for the UE to transmit the reference signal and/or an indicator indicating the type of channel information that the base station subsequently transmits to the UE through a downlink control channel together with information about time, a frequency, sequence resource information, and/or transmission power for transmission of the reference signal. Signal 2 may include an indicator indicating the type of channel information that UE 2 needs to transmit to the base station together with time, a frequency, and/or sequence resource information for the reference signal to be received by UE 2.

The following embodiments may be applied to channel information transmitted by the UE according to the type of channel information included in signal 2. For example, UE 2 may transmit the time, frequency, and sequence index of a reference signal having a strength of a threshold value or higher received by UE 2. In another example, UE 2 may transmit the time, frequency, and sequence index of a reference signal having a strength of a threshold value or less received by UE 2. In order to apply these two embodiments, the threshold value may also be transmitted via signal 2. In this embodiment, beam information may include a beam index indicating a beam direction and a beam size indicating transmission power.

The following embodiments may be applied to channel information received by the UE according to the type of channel information included in signal 1. For example, information about a beam not to be used when transmitting an uplink signal may be transmitted in order to reduce interference in an adjacent sidelink when UE 1 transmits the uplink signal. Alternatively, information about a beam to be preferably used may be transmitted along with information about a beam not to be used by UE 1 when transmitting an uplink signal. Alternatively, information about a beam not to be used by UE 1 when transmitting a sidelink signal may be transmitted along with information about a beam not to be used when transmitting an uplink signal. In this case, the UE may transmit an uplink signal and a sidelink signal using a beam other than the beam indicated by the beam information.

In another example, information about a beam that UE 1 preferably uses when transmitting an uplink signal may be transmitted. Here, the information about the beam is generated by the base station in consideration of a channel between UE 1 and the base station and interference of UE 1 in UE 2. In this case, the UE may transmit an uplink signal using the beam indicated by the beam information.

In this embodiment, beam information may include a beam index indicating a beam direction and a beam size indicating transmission power.

In the embodiment, the information about the beam may be explicitly indicated or may be implicitly indicated. Alternatively, some of the information about the beam may be explicitly indicated, and some thereof may be implicitly indicated. For example, when the base station implicitly reports a beam direction to the UE, the base station may inform the time, frequency, and/or sequence index of the reference signal transmitted by the UE. For example, when reporting the transmission power of the beam to the UE, the base station may explicitly report the transmission power via a transmission power field.

Compared to proposed method 1, proposed method 2 has an advantage of measuring interference of an uplink in a sidelink by measuring a channel between UEs. Therefore, when transmitting a downlink control signal to UE 1, the base station may transmit beam restriction information for uplink transmission. Here, the beam information may include beam direction information and/or beam transmission power information. As a method for the base station to transmit a downlink control signal to UE 1, a method of setting a scheduling field to NULL, a method of including a channel information type field, and a method of masking a CRC with a separate RNTI illustrated in proposed method 1 may be applied. When UE 1 is a UE transmitting a signal in a sidelink, a method in which a resource for transmitting a reference signal is an uplink resource and/or a sidelink resource may be applied. However, when UE 1 transmits a signal in an uplink, there may be the following changed advantage and disadvantage.

That is, when the sidelink and the uplink have different numerologies and share time/frequency resources, the UE operates as follows. When a reference signal transmission resource for the UE is configured in an uplink resource, the UE may perform the following two operations.

Opt 1) The UE transmits a reference signal using uplink numerology.

Opt 2) The UE transmits a reference signal using sidelink numerology.

When a reference signal transmission resource for the UE is configured in a sidelink resource, the UE may perform the following two operations.

Opt 3) The UE transmits a reference signal using the sidelink numerology.

Opt 4) The UE transmits a reference signal using the uplink numerology.

The proposed method enables time/frequency resources to be shared even when the sidelink and the uplink have different numerologies. Opt 1 and Opt 4 of proposed method 1 have the effect of reducing the overhead of the base station, because the base station just needs to receive the SRS in view of only single numerology in an uplink SRS resource region. Further, interference is measured using an actual uplink transmission signal, thus increasing accuracy of interference measurement. However, since UE 2 needs to receive a reference signal using uplink numerology, complexity of the UE is increased. Opt2 and Opt 3 have the same numerology, and thus UE complexity is reduced, whereas base station complexity is increased. In addition, interference of UE 1 in a different UE (UE 2) of a sidelink is reduced.

Proposed Method 3

A resource for UE 1 to transmit a signal to UE 2 and a resource for UE 1 to receive from UE 2 are referred to as a transmission resource 1 and a reception resource 1, respectively. A resource for UE 1 to transmit a signal to UE 3 or a base station and a resource for UE 1 to receive from UE 3 or the base station are referred to as a transmission resource 2 and a reception resource 2, respectively. The transmission resource 1 and the reception resource 1 need to be allocated in different time and/or frequency resources so as not to overlap. The transmission resource 1 may partially or entirely overlap the transmission resource 2 or the reception resource 2 in time and/or frequency resources. The reception resource 1 may partially or entirely overlap the transmission resource 2 or the reception resource 2 in time and/or frequency resources. The number of overlapping resources may be set to the number of RUs having interference between RUs in the UE that is a threshold value or less.

Figure 18:
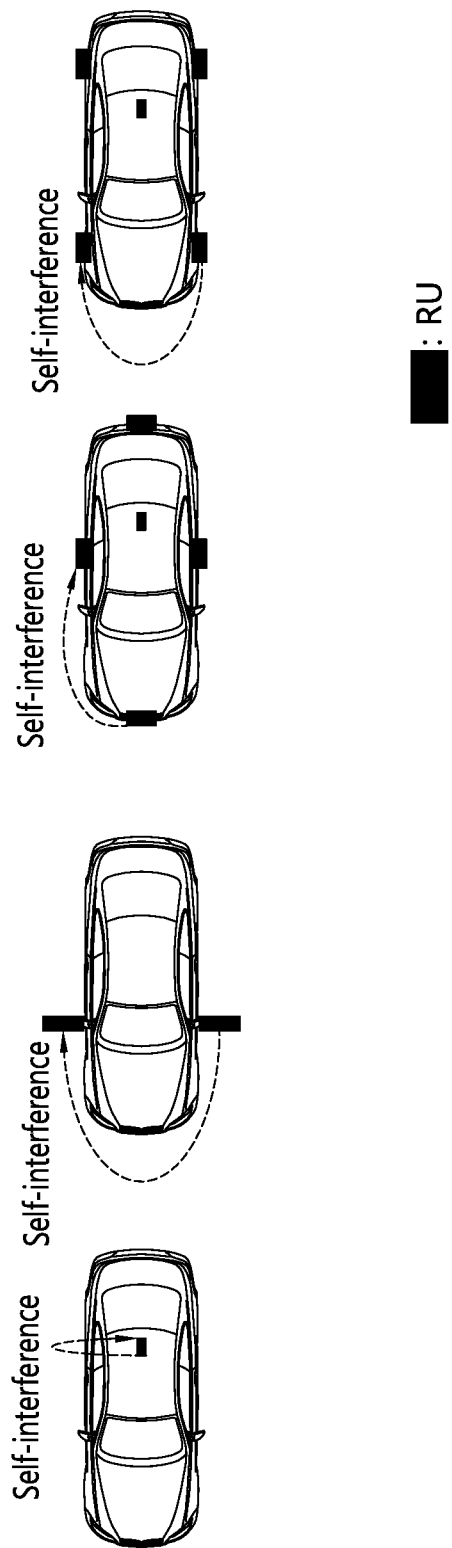
FIG. 18 illustrates an example of an RU arrangement of a UE for an operation in a communication link between UEs.

FIG. 18 illustrates an example of an RU arrangement of a UE for an operation in a communication link between UEs.

The number of RUs that each UE has and the strength of interference between RUs may vary per UE. Accordingly, the number of unicast communication links for each UE can simultaneously perform transmission and reception varies.

In a first example 1810 of FIG. 18, a UE may have only one RU. In this case, the UE may transmit or receive a signal via one communication link at a time. In a fourth example 1840 of FIG. 18, a UE has four RUs, but interference may occur between two front RUs. Therefore, when the UE communicates with a front vehicle in the same lane, it is difficult to apply full duplex (FD) of simultaneously performing transmission and reception. In order to apply FD, an additional device, such as an analog interference canceller, needs to be introduced to the UE, which increases complexity and costs of the UE. Thus, it is difficult to force the UE to introduce an analog interference canceller. In addition, since the required delay time of general enhanced V2X (eV2X) is 3 ms, it is easy to satisfy desired requirements in device-to-device unicast communication even though FD is not applied. For this reason, an operation in a communication link between UEs needs to be performed as in TDD or FDD. That is, since interference may occur between RUs that a UE has, the UE may operate according to half duplex (HD) rather than FD.

If a specific UE has a plurality of RUs and interference between some RUs is insignificant, the UE may receive a signal via RU 1 and transmit a signal via RU 2. That is, when using a plurality of RU, the UE may operate like FD. However, when interference between the RUs is significant or there is one RU, FD cannot be applied. Here, since beams of the RUs are oriented in different directions, devices connected to the respective RUs may be different UEs or base stations. Therefore, when the respective RUs are connected to different UEs, it is possible to design time and/or frequency resources to be shared. That is, the time and/or frequency resources may be divided by SDD.

Figure 19:
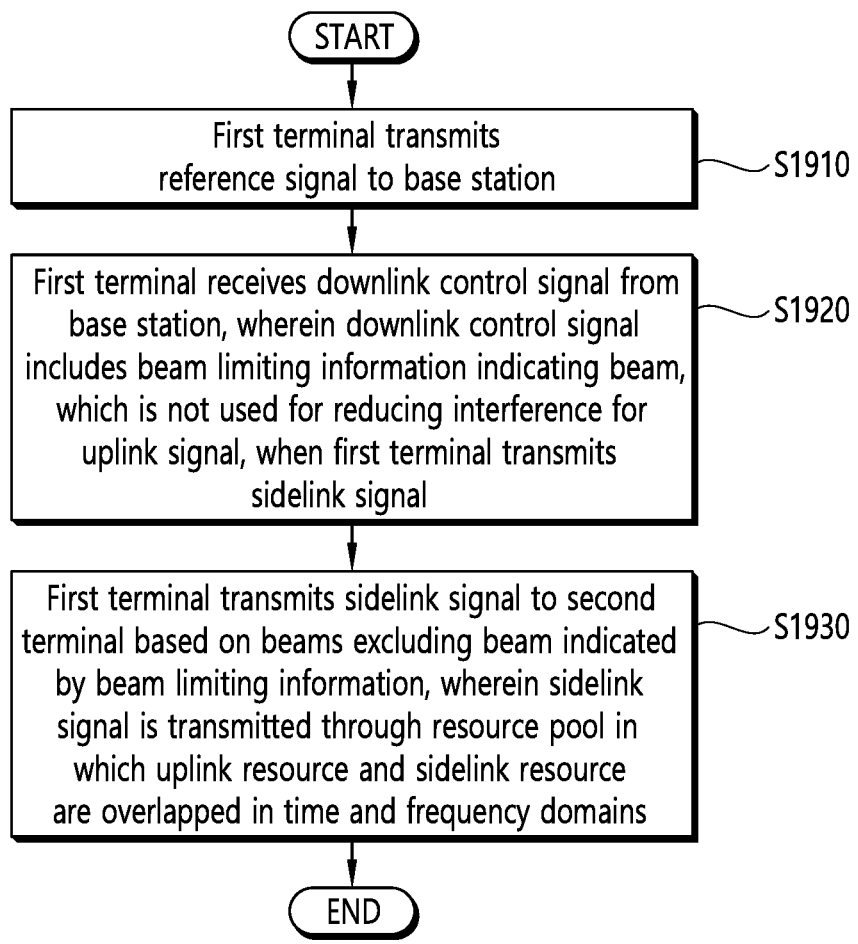
FIG. 19 is a flowchart illustrating a procedure for performing device-to-device communication by sharing an uplink resource and a sidelink resource according to an embodiment of the present specification.

FIG. 19 is a flowchart illustrating a procedure for performing device-to-device communication by sharing an uplink resource and a sidelink resource according to an embodiment of the present specification.

According to the present embodiment, a signal may be transmitted and received between a first UE and a second UE through a sidelink, and a signal may be transmitted and received between the first UE and a base station through an uplink. An uplink resource and a sidelink resource share a time/frequency resource, which may be spatially divided using a beam to which a distributed antenna is applied to thereby perform communication. In this case, the UE may have a plurality of radio units (RUs), an RU may correspond to an antenna port, and a beam or a beam group may be set with the antenna port.

In step S1910, the first UE transmits a reference signal to the base station. The reference signal is transmitted to determine beam information used for transmitting a sidelink signal. The reference signal may correspond to an SRS.

Before the first UE transmits the reference signal, the first UE may receive UE-specific allocation information about the reference signal from the base station. The allocation information about the reference signal may include information about transmission time, a transmission frequency, a sequence resource, transmission power for the reference signal and information about an antenna port through which the reference signal is transmitted.

In step S1920, the first UE receives a downlink control signal from the base station. The downlink control signal includes beam restriction information indicating a beam that is not used to reduce interference in an uplink signal when the first UE transmits a sidelink signal.

The beam restriction information may be explicitly included in the downlink control signal as a beam index. Alternatively, the beam restriction information may be implicitly included in the downlink control signal. For example, the time, frequency, or sequence resource index used for the UE to transmit the reference signal may be implicitly indicated via the downlink control signal. Here, when the UE uses beam A in time resource 1 and the base station indicates time resource 1 information as the beam restriction information via the downlink control signal, the UE may determine that beam A is restricted. This operation may also be applied when beam recommendation information is transmitted via the downlink control signal.

The downlink control signal may further include beam recommendation information indicating a beam used when the first UE transmits an uplink signal. In addition, the downlink control signal may further include a channel information type field. When the channel information type field indicates a first value, the beam recommendation information may be included in the downlink control signal. When the channel information type field indicates a second value, the beam restriction information may be included in the downlink control signal.

Although it has been mentioned that the beam restriction information corresponds to sidelink beam-related information and the beam recommendation information corresponds to uplink beam-related information, this is merely an example. Instead, various modifications may be applicable such that the beam restriction information may be uplink beam-related information and the beam recommendation information may be sidelink beam-related information.

In step S1930, the first UE transmits the sidelink signal to the second UE using a beam other than the beam indicated by the beam restriction information. The sidelink signal is transmitted through a resource pool in which an uplink resource and a sidelink resource overlap in time and frequency domains. The uplink signal may be transmitted to the base station through the resource pool using the beam indicated by the beam recommendation information. Accordingly, incurred interference between the uplink and the sidelink may be prevented using an overlapping resource.

Here, the first UE may receive allocation information about the resource pool from the base station cell-commonly or UE-specifically. In the present embodiment, the base station merely transmits only the allocation information about the resource pool in which the uplink resource and the sidelink resource overlap without controlling device-to-device unicast communication.

The beam restriction information may also include the index and transmission power of the beam not used when the first UE transmits the sidelink signal. The beam recommendation information may include the index and transmission power of the beam used when the first UE transmits the uplink signal.

Here, the sidelink signal may be transmitted using transmission power lower than that of the beam not used when the first UE transmits the sidelink signal. The uplink signal may be transmitted using the transmission power of the beam used when the first UE transmits the uplink signal.

The first UE may receive a first temporary identifier and a second temporary identifier from the base station, which is for allocating an additional temporary identifier to specify the type of channel information in the downlink control signal.

When the cyclic redundancy check (CRC) of the downlink control signal is masked with the first temporary identifier, the beam recommendation information may be included in the downlink control signal. When the CRC of the downlink control signal is masked with the second temporary identifier, the beam restriction information may be included in the downlink control signal.

The downlink control signal may further include a scheduling field for the uplink signal. Here, even when the base station does not perform uplink scheduling for the first UE, the scheduling field for the uplink signal may be included. When the first UE does not transmit the uplink signal, the scheduling field for the uplink signal may be set to NULL. When the scheduling field is set to NULL, the first UE may determine that beam-related information for transmitting the sidelink signal is transmitted through the downlink control signal.

The sidelink signal may be transmitted in a unicast or multicast manner A device-to-device broadcast or discovery signal needs a dedicated resource. However, since a device-to-device unicast signal is aperiodically transmitted when traffic is generated in the UE, the sidelink resource overlaps with the uplink resource, thereby reducing resource consumption.

Figure 20:
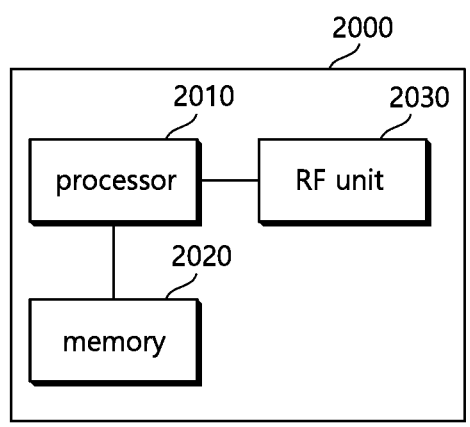
FIG. 20 is a block diagram showing an apparatus for wireless communication for implementing an embodiment of the present specification.

FIG. 20 is a block diagram showing an apparatus for wireless communication for implementing an embodiment of the present specification.

An apparatus 2000 for wireless communication includes a processor 2010, a memory 2020 and a radio frequency (RF) unit 2030.

The processor 2010 may be configured to implement proposed functions, procedures and/or methods described in this description. Layers of the radio interface protocol may be implemented in the processor 2010. The processor 2010 may handle a procedure explained above. The memory 2020 is operatively coupled with the processor 2010, and the RF unit 2030 is operatively coupled with the processor 2010.

The processor 2010 may include application-specific integrated circuit (ASIC), other chipset, logic circuit and/or data processing device. The memory 2020 may include read-only memory (ROM), random access memory (RAM), flash memory, memory card, storage medium and/or other storage device. The RF unit 2030 may include baseband circuitry to process radio frequency signals. When the embodiments are implemented in software, the techniques described herein can be implemented with modules (e.g., procedures, functions, and so on) that perform the functions described herein. The modules can be stored in memory 2020 and executed by processor 2010. The memory 2020 can be implemented within the processor 2010 or external to the processor 2010 in which case those can be communicatively coupled to the processor 2010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for performing device-to-device communication by sharing an uplink resource and a sidelink resource in a wireless communication system, the method comprising:
  transmitting, by a first user equipment (UE), a reference signal to a base station;
  receiving, by the first UE, a downlink control signal from the base station, the downlink control signal comprising beam restriction information indicating a beam not used to reduce interference in an uplink signal when the first UE transmits a sidelink signal; and
  transmitting, by the first UE, the sidelink signal to a second UE using a beam other than the beam indicated by the beam restriction information, the sidelink signal being transmitted through a resource pool in which the uplink resource and the sidelink resource overlap in time and frequency domains.

2. The method of claim 1, wherein the downlink control signal further comprises beam recommendation information indicating a beam used when the first UE transmits an uplink signal, and
  the uplink signal is transmitted to the base station through the resource pool using the beam indicated by the beam recommendation information.

3. The method of claim 2, wherein the beam restriction information comprises an index and transmission power of the beam not used when the first UE transmits the sidelink signal, and
  the beam recommendation information comprises an index and transmission power of the beam used when the first UE transmits the uplink signal.

4. The method of claim 3, wherein the sidelink signal is transmitted based on transmission power lower than the transmission power of the beam not used when the first UE transmits the sidelink signal.

5. The method of claim 2, wherein the downlink control signal further comprises a channel information type field,
  the beam recommendation information is comprised in the downlink control signal when the channel information type field indicates a first value, and
  the beam restriction information is comprised in the downlink control signal when the channel information type field indicates a second value.

6. The method of claim 2, further comprising:
  receiving, by the first UE, a first temporary identifier and a second temporary identifier from the base station,
  wherein the beam recommendation information is comprised in the downlink control signal when a cyclic redundancy check (CRC) of the downlink control signal is masked with the first temporary identifier, and
  the beam restriction information is comprised in the downlink control signal when the CRC of the downlink control signal is masked with the second temporary identifier.

7. The method of claim 1, further comprising:
  receiving, by the first UE, allocation information about the resource pool from the base station cell-commonly or UE-specifically.

8. The method of claim 1, further comprising:
  receiving, by the first UE, allocation information of the reference signal from the base station UE-specifically,
  wherein the allocation information of the reference signal comprises information about transmission time, a transmission frequency, a sequence resource, transmission power for the reference signal and information about an antenna port for transmitting the reference signal.

9. The method of claim 1, wherein the downlink control signal further comprises a scheduling field for an uplink signal, and
  the scheduling field for the uplink signal is set to NULL when the first UE does not transmit the uplink signal.

10. The method of claim 1, wherein the sidelink signal is transmitted in a unicast or multicast manner.

11. A first user equipment (UE) performing device-to-device communication by sharing an uplink resource and a sidelink resource in a wireless communication system, the first UE comprising:
  a radio frequency (RF) unit to transmit and receive a radio signal; and
  a processor connected to the RF unit,
  wherein the processor transmits a reference signal to a base station, receives a downlink control signal from the base station, the downlink control signal comprising beam restriction information indicating a beam not used to reduce interference in an uplink signal when the first UE transmits a sidelink signal, and transmits the sidelink signal to a second UE using a beam other than the beam indicated by the beam restriction information, the sidelink signal being transmitted through a resource pool in which the uplink resource and the sidelink resource overlap in time and frequency domains.

12. The first UE of claim 11, wherein the downlink control signal further comprises beam recommendation information indicating a beam used when the first UE transmits an uplink signal, and
  the uplink signal is transmitted to the base station through the resource pool using the beam indicated by the beam recommendation information.

13. The first UE of claim 12, wherein the beam restriction information comprises an index and transmission power of the beam not used when the first UE transmits the sidelink signal, and
  the beam recommendation information comprises an index and transmission power of the beam used when the first UE transmits the uplink signal.

14. The first UE of claim 13, wherein the sidelink signal is transmitted based on transmission power lower than the transmission power of the beam not used when the first UE transmits the sidelink signal.

15. The first UE of claim 12, wherein the downlink control signal further comprises a channel information type field,
  the beam recommendation information is comprised in the downlink control signal when the channel information type field indicates a first value, and
  the beam restriction information is comprised in the downlink control signal when the channel information type field indicates a second value.

16. The first UE of claim 12, wherein the processor receives a first temporary identifier and a second temporary identifier from the base station, the beam recommendation information is comprised in the downlink control signal when a cyclic redundancy check (CRC) of the downlink control signal is masked with the first temporary identifier, and the beam restriction information is comprised in the downlink control signal when the CRC of the downlink control signal is masked with the second temporary identifier.

17. The first UE of claim 11, wherein the processor receives allocation information about the resource pool from the base station cell-commonly or UE-specifically.

18. The first UE of claim 11, wherein the processor receives allocation information of the reference signal from the base station UE-specifically, and the allocation information of the reference signal comprises information about transmission time, a transmission frequency, a sequence resource, transmission power for the reference signal and information about an antenna port for transmitting the reference signal.

19. The first UE of claim 11, wherein the downlink control signal further comprises a scheduling field for an uplink signal, and the scheduling field for the uplink signal is set to NULL when the first UE does not transmit the uplink signal.

20. The first UE of claim 11, wherein the sidelink signal is transmitted in a unicast or multicast manner.

* * * * *